United States Patent
Wainer

(10) Patent No.: US 12,387,118 B1
(45) Date of Patent: Aug. 12, 2025

(54) PREDICTIVE MODELING TO IDENTIFY ANOMALOUS LOG DATA

(71) Applicant: Rapid7, Inc., Boston, MA (US)

(72) Inventor: Douglas George Wainer, Dublin (IE)

(73) Assignee: Rapid7, Inc., Boston, MA (US)

( * ) Notice: Subject to any disclaimer, the term of this patent is extended or adjusted under 35 U.S.C. 154(b) by 1238 days.

(21) Appl. No.: 17/116,435

(22) Filed: Dec. 9, 2020

Related U.S. Application Data

(60) Provisional application No. 62/947,032, filed on Dec. 12, 2019.

(51) Int. Cl.
| | |
|---|---|
| *G06N 7/01* | (2023.01) |
| *G06F 16/903* | (2019.01) |
| *G06F 18/214* | (2023.01) |
| *G06F 18/2415* | (2023.01) |
| *G06F 40/151* | (2020.01) |

(52) U.S. Cl.
CPC ......... *G06N 7/01* (2023.01); *G06F 16/90344* (2019.01); *G06F 18/214* (2023.01); *G06F 18/2415* (2023.01); *G06F 40/151* (2020.01)

(58) Field of Classification Search
CPC ... G06N 7/01; G06F 16/90344; G06F 18/214; G06F 18/2415; G06F 40/151
See application file for complete search history.

(56) References Cited

U.S. PATENT DOCUMENTS

| | | |
|---|---|---|
| 8,997,229 B1 | 3/2015 | Huang et al. |
| 10,685,293 B1 * | 6/2020 | Heimann ............ H04L 63/1425 |
| 2016/0306806 A1 | 10/2016 | Fackler et al. |
| 2017/0076012 A1 | 3/2017 | Sreenivasa et al. |

OTHER PUBLICATIONS

Chelba C, Norouzi M, Bengio S. N-gram language modeling using recurrent neural network estimation. arXiv preprint arXiv: 1703.10724. Mar. 31, 2017.*
Carrasco RS, Sicilia MA. Unsupervised intrusion detection through skip-gram models of network behavior. Computers & Security. Sep. 1, 2018;78:187-97. (Year: 2018).*

(Continued)

*Primary Examiner* — Oluwatosin Alabi
(74) *Attorney, Agent, or Firm* — Ashwin Anand

(57) ABSTRACT

Disclosed herein are methods, systems, and processes for interference-based detection and identification of anomalous log data using predictive modeling. A log data that includes a path with strings is accessed. Multiple anomalous log data prediction models are trained for the path by processing the strings at a character level and at a name level using disparate Markov prediction models that include n-gram and skip gram models after performing an A-replace operation. A trained dataset is generated based on the training that includes a simplified path for each of the various anomalous log data prediction models along with a transition probability for each string in the path. Other paths in the log or other logs are trained using the trained dataset and the several trained anomalous log data prediction models are deployed to observe, identify, and highlight anomalous strings in new log data.

20 Claims, 26 Drawing Sheets

(56) References Cited

OTHER PUBLICATIONS

Kubacki M, Sosnowski J. Holistic processing and exploring event logs. InSoftware Engineering for Resilient Systems: 9th International Workshop, SERENE 2017, Geneva, Switzerland, Sep. 4-5, 2017, Proceedings 9 2017 (pp. 184-200). Springer International Publishing. (Year: 2017).*

Hamooni H, Debnath B, Xu J, Zhang H, Jiang G, Mueen A. Logmine: Fast pattern recognition for log analytics. InProceedings of the 25th ACM international on conference on information and knowledge management Oct. 24, 2016 (pp. 1573-1582). (Year: 2016).*

Zimmeck S, Story P, Smullen D, Ravichander A, Wang Z, Reidenberg J, Russell NC, Sadeh N. Maps: Scaling privacy compliance analysis to a million apps. Proceedings on Privacy Enhancing Technologies. 2019. (Year: 2019).*

Vobbilisetty R, Di Troia F, Low RM, Visaggio CA, Stamp M. Classic cryptanalysis using hidden Markov models. Cryptologia. Jan. 2, 2017;41(1):1-28. (Year: 2017).*

Bertero C, Roy M, Sauvanaud C, Trédan G. Experience report: Log mining using natural language processing and application to anomaly detection. In2017 IEEE 28th International Symposium on Software Reliability Engineering (ISSRE) Oct. 23, 2017 (pp. 351-360). IEEE. (Year: 2017).*

Šrndić N, Laskov P. Hidost: a static machine-learning-based detector of malicious files. EURASIP Journal on Information Security. Dec. 2016;2016:1-20. (Year: 2016).*

Järvelin A, Järvelin A, Jarvelin K. s-grams: Defining generalized n-grams for information retrieval. Information Processing & Management. Jul. 1, 2007;43(4):1005-19. (Year: 2007).*

Forsyth, D. (2018). Markov Chains and Hidden Markov Models. In: Probability and Statistics for Computer Science. Springer, Cham. https://doi.org/10.1007/978-3-319-64410-3_14 (Year: 2018).*

Liu, F., Wen, Y., Zhang, D., Jiang, X., Xing, X. and Meng, D., Nov. 2019. Log2vec: A heterogeneous graph embedding based approach for detecting cyber threats within enterprise. In Proceedings of the 2019 ACM SIGSAC conference on computer and communications security (pp. 1777-1794). (Year: 2019).*

Böhmer K, Rinderle-Ma S. Automatic signature generation for anomaly detection in business process instance data. InEnterprise, Business-Process and Information Systems Modeling: 17th International Conference, BPMDS 2016, 21st International Conference, EMMSAD 2016, Held at CAISE 2016, (Year: 2016).*

* cited by examiner

Natural Language Processing (NLP) String
405

C="that" ~ W=["car", "is", "very", "good"] → ["that", "is"], ["that", "very"], ["that", "good"]
C="car" ~ W=["that", "is", "very", "good"] → ["car", "is"], ["car", "very"], ["car", "good"]
C="is" ~ W=["that", "car", "very", "good"] → ["is", "car"], ["is", "very"], ["is", "good"]
C="very" ~ W=["that", "car", "is", "good"] → ["that", "car"], ["very", "is"], ["very", "good"]
C="good" ~ W=["that", "car", "is", "very"] → ["good", "that"], ["good", "is"], ["good", "very"]

Log
305(n)

processName="bitsadmin.exe"

md5="dc81872e3e6bca39b322a7fa1a044040"

path="C:\Windows\system32\bitsadmin.exe"

metadata.companyName="Microsoft Corporation"

metadata.version="7.5.7600.16385
(win7_rtm.090713-1255)"

Modified Word Embedding
410

C=processName ~ W=[md5, path, metadata.productName, metadata.version]

C=md5 ~ W=[processName, path, metadata.productName, metadata.version]

C=path ~ W=[processName, md5, metadata.productName, metadata.version]

C=metadata.productName ~ W=[processName, md5, path, metadata.version]

C=metadata.version ~ W=[processName, md5, path, metadata.product.Name]

```
                    Training Filter
                         805

"domain": true,
    "data": {
            metadata": {
                    "owners": {
                            "[*]": true
                    },
                    "ProductName": true,
                    "CompanyName": true,
                    "FileVersion": true
            },
            "signingDetails": {
                    "reasonCode": true,
                    "status": true
            },
            "user": true,
            "hashes": {
                    "sha256": true,
                    "md5": true,
                    "sha1": true
            },
            "processName": true,
            "domain": true,
            "executablePath": true,
            "imgPath": true,
            "cmdLine": true,
    },
    "hostname": true
```

FIG. 8

Markovian Analysis Engine
175

C:\ProgramDataewposnfpwe\cxnvxio.exe

C:\users\user61\appdata\local\apps\2.0\0cyyyw94_wt9\lcw31498.at7\
dell...tion_831211ca63b981c5_0008.000b_165622fff4cd0fc1\dell\systemdetect.exe C:\users\user1232\appdata\local\microsoft\onedrive\onedrive.exe C:\users\admin-dave\appdata\local\microsoft\onedrive\onedrive.exe C:\users\user12\appdata\local\microsoft\onedrive\onedrive.exe C:\users\user821\appdata\local\microsoft\onedrive\onedrive.exe C:\users\software_svc\appdata\local\microsoft\onedrive\onedrive.exe

PREDICTIVE MODELING TO IDENTIFY ANOMALOUS LOG DATA

CROSS-REFERENCE TO RELATED APPLICATIONS

The present application claims benefit of priority to U.S. Provisional Patent Application No. 62/947,032 filed on Dec. 12, 2019 titled "Log Anomaly Detection, Analysis, and Visualization," the disclosure of which is hereby incorporated by reference as if set forth in its entirety herein.

BACKGROUND

Field of the Disclosure

This disclosure is related to context-based identification of anomalous log data in managed detection and response (MDR) computing environments.

Description of the Related Art

Modern computing networks and devices generate a significant amount of log data that can be useful in a cybersecurity context. Identifying malware in voluminous amounts of log data is of paramount importance to modern security operations. In a typical managed detection and response (MDR) scenario, a security analyst in a security operations center (SOC) painstakingly reviews and analyzes log data to identify anomalous patterns in log tokens and paths (e.g., potential malware), in a process called threat hunting.

Malware tends to prefer randomized strings. One method to identify malware during threat hunting is to gather a large set of log data and "stack" fields (e.g., by counting the unique values for a particular field). A path that contains unusual or randomized strings can be a sign of malware. Unfortunately, finding such unusual or randomized strings in a sea of legitimate paths is a laborious task and is ill suited to be performed manually. What's more, even legitimate software can use some form of randomized strings. Although normalizations can help to some extent, such normalizations are typically performed manually on a case by case basis. Therefore, these foregoing practices are untenable at larger scales.

SUMMARY OF THE DISCLOSURE

Disclosed herein are methods, systems, and processes of predictive modeling that is optimized to identify anomalous log data. One such method involves accessing a log that includes a path with several strings and training multiple disparate anomalous log data prediction models for the path by processing one or more of the several strings at a character level and at a name level using one or more Markov prediction models that include one or more n-gram models and one or more skip-gram models after performing at least one A-replace operation. The method also involves generating a trained dataset based on the training that includes a simplified path for each of the anomalous log data prediction models with a transition probability for each string in the path and then training other paths in the log or other logs using the trained dataset and the trained anomalous log data prediction models.

In one embodiment, the A-replace operation includes performing regular expression (regex) character replacement for one or more special characters in the plurality of strings by replacing (a) one or more alphanumeric characters, (b) one or more numbers, or (c) one or more upper case characters, one or more low case characters, and one or more numbers. Performing the regex character replacement identifies one or more common patterns of special characters that include globally unique identifiers (GUIDs).

In another embodiment, the method involves generating a character heatmap in a graphical user interface (GUI) for each simplified path processed by the anomalous log data prediction models based on the transition probability for each string of each path. The transition probability indicates a probability of characters in each string of each path and the character heatmap designates each character in each simplified path as high likelihood or low likelihood.

In certain embodiments, the method involves receiving historical log data, batching the historical log data into multiple paths, and filtering the batched paths based on a single type of string of one or more types of strings that are part of the paths (e.g., a log file full of file paths for one or more customers and/or networks, and the like). In this example, the one or more types of strings include a file path and a child process (among other types of contemplated strings), the strings include key/value (KV) pairs, and the anomalous log data prediction models include convolutional filters.

In some embodiments, the method involves receiving a new process event, extracting a new path from the new process event, processing the new path using the trained anomalous log data prediction models that are trained using an updated trained dataset that includes several transition probabilities of several paths, generating an updated character heatmap that indicates a likelihood of each character in the new path predicted by each of the trained anomalous log data prediction models, and generating a regex replacement or normalization for (a) each of one or more new strings in the new path and (b) for one or more existing strings in the path or in other paths in the log, that creates a new simplified path for each of the trained anomalous log data prediction models.

In other embodiments, the method involves accessing the updated character heatmap, comparing each of the new simplified paths for each of the trained anomalous log data prediction models based on the likelihood that each character in the new path is high likelihood or low likelihood, and based on the comparing, identifying one or more new simplified paths of one or more trained anomalous log data prediction models as anomalous.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 4 is a block diagram 400 of a modified word embedding model, according to one embodiment of the present disclosure.

FIG. 8 is a block diagram 800 of a training filter, according to one embodiment of the present disclosure.

FIG. 21 is a block diagram 2100 of a Markovian analysis engine, according to one embodiment of the present disclosure.

Figure 1A:
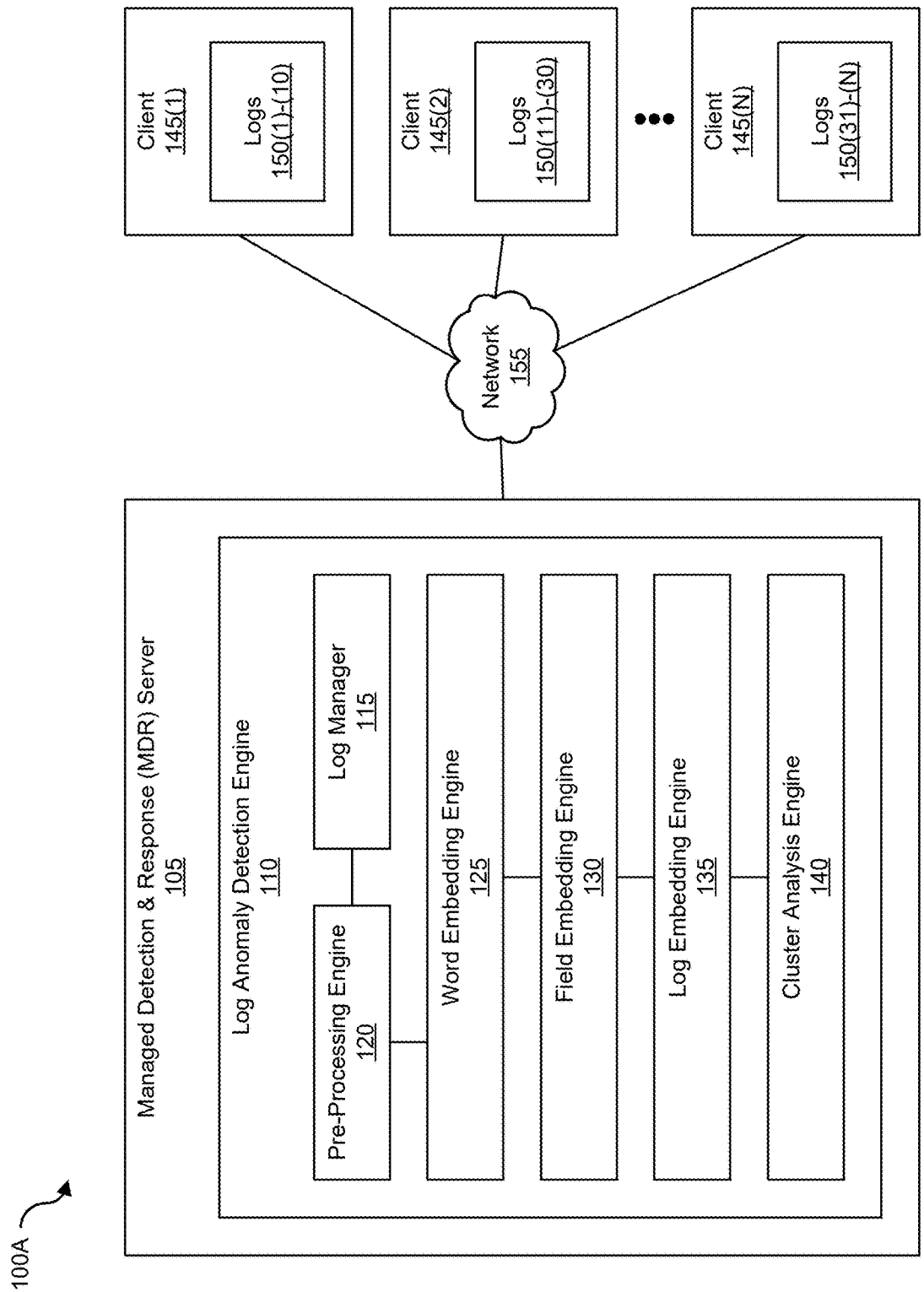
FIG. 1A is a block diagram 100A of a managed detection and response (MDR) server, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure.

DETAILED DESCRIPTION

Example of Optimized Markovian Modeling Paradigms for Threat Hunting

Systems, methods, processes, and machine learning models to use predictive modeling to identify anomalous log data are disclosed. A variation of Markovian string analysis using novel techniques is proposed. Markovian analysis engine 175 of MDR server 105 uses a variety of Markov prediction models, including n-grams, skip grams-however, these models are applied at both an individual character level, and because paths and command line arguments are implicated, at a folder/file name level. In addition, a variety of regular character (regex) replacements are performed for pre-processing purposes—to develop Markov models solely for picking up common patterns of special characters (e.g., globally unique identifiers (GUIDs)). Multiple trained Markov models can be applied to either individual key/values in a log to generate a probabilistic likeliness of particular values (e.g., file paths). However, such Markov models and analysis can also be applied to several key/values in a log to generate a probabilistic likeliness of a particular log. Next, a user interface component is configured and implemented to apply a heatmap based on probability to characters in a string (e.g., as shown in FIG. 21). Characters that have a high likelihood based on the foregoing models-based analysis can be presented in a particular color (e.g., green), whereas characters that have a low likelihood can be presented in another color (e.g., red). When reviewing paths/logs with low probabilistic likelihoods, it may not be obvious (e.g., to a detection system or a security analyst) why that path is unlikely. Highlighting characters that are unlikely permits immediate identification of irregular log data. Finally, normalization or regex replacement is suggested for particular sets of paths (e.g., to address a problem where GUIDs and other common patterns introduce a lot of noise into lists of unique values).

Markov chains enable the building of transition probabilities for characters in a log string or for sets of characters in a log string or words (e.g., if we have char. A, the probability that the next character will be char. B). Various Markov prediction models can be used to generate transition probabilities using log data (e.g., building transition probabilities or probability densities using n-gram, skip-gram, and the like). Malware authors typically use a random string for an executable name because a same string is easily identified (e.g., folder, file name, or any string in a path or in a log). Therefore, strings provide targets for file paths and command line arguments that are part of log data.

In one embodiment, Markovian analysis engine 175 builds up transition probabilities of characters with various Markov methods. Transition probabilities are generated for strings and tokens in a path (e.g., foldername/programfiles/ whatcomesafter—where the whatcomesafter (e.g., Adobe) has a transition probability). This foregoing transition probability generation is performed both at a character level and at a word level and results in one or more predictive models (e.g., foldername/Windows/randomstring, where the random string is considered unlikely and will (or should) generate an alert).

Unfortunately, a simple Markov-based string analysis is insufficient to accurately and quickly identify anomalous log data because there is no regex replacement for a random string-Markovian analysis fails when it comes across unique paths and random characters. Therefore, it is also imperative to get rid of (or clean up) random data that is unique from a computer standpoint (e.g., a unique string), but is not usual from a security standpoint. Therefore, in some embodiments, regex replacement is performed to constrain the cardinality of the random token.

In certain embodiments, a Markov chain is accessed and a n-gram-based probability chain and a skip-gram-based probability chain is generated (e.g., training is done using historical log data). The training adds convolution—it destroys information, makes paths simpler, and reduces the space of options (e.g., for command lines and paths). As noted, traditional Markov methods are over-inclusive. A random string does not necessarily mean that it is unusual or malicious. While existing Markov methods work sufficiently well in the realm of linguistics, they are ill-suited for threat hunting. Therefore, path simplification is required.

In some embodiments, strings are simplified across multiple paths. While the training is the same from a n-gram or skip-gram perspective, the data is simplified by performing at least one of three possible A-replace operations. In this manner, when a Markov chain transition is performed, Markovian analysis engine 175 will only pick up special characters (e.g., by learning from white space, GUIDs, colons, slashes, braces, and the like). Therefore, in this example, A-replace is performed by generating regex replacements in three ways: (a) replacing just alphanumeric characters regardless of case, (b) replacing just numeric characters, or (c) replacing characters for upper case characters, lower case characters, and numbers. Thus, there is simplification across multiple paths, and in the end, the path is the same length.

For example, an input (e.g., a path with various strings and characters) C:\ProgramData{1B8BDEE8-91C9-542E-170F-CA6C8D4D41A2}\nema.txt, becomes and is A:\AAAAAAAAAA{AAAAAAAA-AAAA-AAAA-AAAA-AAAAAAAAAAAA}\AAAA.AAA under A-replace and 1:\11{8-4-4-4-12}\4.3 under N-shrink (e.g., a universal unique identifier (UUID)). With the A-replace representation for alphanumeric characters, a relationship is developed between "A" characters and special characters in the path. Thereafter, and as part of and in reference to the same foregoing example, if a new path is received (e.g., from a new log), a brace can be identified in the new path and a transition probability can be calculated for the brace (e.g., likely an alphanumeric character). Markovian analysis engine 175 can then make a prediction that there is a GUID and can also predict that the transition probability for the next 8 characters is alphanumeric and after 8 characters, the next character is likely to be a dash. Once Markovian analysis engine 175 has determined various transition probabilities from the trained dataset, Markovian analysis engine 175 determines which parts of the new path are likely and which characters are unlikely (e.g., which characters are standard and well predicted by the various anomalous log data prediction models and which ones are not). In some embodiments, the foregoing is represented by a character heatmap, as shown in FIG. 21.

In one embodiment, Markovian analysis engine 175 can determine that for a first path (e.g., programdata/randomfilepath), the file path and characters (e.g., after randomfilepath or after the slash (/)) are not likely based on one or more anomalous log data prediction models and that this is an indication that the first path is a malicious and/or randomized file path. In other embodiments, Markovian analysis engine 175 can determine which anomalous log data prediction model(s) have a bad (or weak) prediction for another path (e.g., C:\users\user61 . . . ). For example, a good prediction might be had under N-shrink, but a bad prediction might result when standard Markov models are used. In certain embodiments, a given path may look random but can include certain characters and strings that are staying in the same place. In this scenario, Markovian analysis engine 175 suggests and generates a regex replacement based on such a string—to completely destroy all randomness. For example, because special characters can be predicted but alphanumeric characters between special characters cannot be predicted, a new regex (replacement) rule can be suggested (e.g., 1:\11{8-4-4-4-12}\4.3). In this manner, Markovian analysis engine 175 exposes a given path to multiple prediction models and can determine which predictive models are predicting certain paths over others.

In some embodiments, the Markov models are initially trained on historical path data and command line data (e.g., historical log data is batched and filtered to one particular type of string such as a child process, file path, and the like, resulting in a big file full of file paths). If a new process event is received, a new path is extracted from the new process event. The new path is processed and analyzed using several disparate anomalous log data prediction models with convolution filters (that have been trained using the training dataset) to determine the likelihood of each character/token for that path. Markovian analysis engine 175 then generates a heatmap (as shown in FIG. 21) for each responsive and disparate anomalous log data prediction model. In this example, some of the models produce good predictions where as others produce had predictions. Based on the model prediction(s), a regex replacement is suggested.

In one embodiment, a first set of anomalous log data prediction models (e.g., n-gram or skip gram) are used to generate transition probabilities or probability densities. But before data in the form of path inputs are fed into the first set of anomalous log data prediction models, at least one A-replace operation (e.g., regex replacement) is performed (e.g., replacement of just alphanumeric characters, just numbers, or uppercase characters, lower case characters, and numbers)—at an individual character level and at a folder/file name level. This clean, de-constructed and A-replaced data is again fed into the first set of Markov models to generate predictions of transition probabilities for each character and/or token. Once a new path is encountered as part of a new process event, the new path is fed into the first set trained (and updated) anomalous log data prediction models to generate a probability for each character (e.g., char. A, char. B, and the like) or each token (e.g., folder name).

Once these probabilities are obtained, Markovian analysis engine 175 generates an updated character heatmap that identifies a first sub-set of the first set of anomalous log data prediction models that produce a bad prediction and another sub-set of the first set of anomalous log data prediction models that produce a good prediction (e.g., for the given new path under investigation and analysis). Markovian analysis engine 175 then performs a compare and contrast operation to determine which anomalous log data prediction models in the first set illustrates a diversity that is above a given diversity threshold (e.g., a significant amount of green and red in the path can be indicative of a complex string of special characters). However, further regex replacement optimization may be necessary to further simplify log paths.

In certain embodiments, Markovian analysis engine 175 analyzes more new data (e.g., a month's worth of new process data). Markovian analysis engine 175 can then identify one or more anomalous log data prediction models for whom one or more paths (that are part of the new log data) do not change (e.g., an N-shrink model as described in the example above). Markovian analysis engine 175 can then identify and make an inference that a given string in (new) path(s) that well-predicted by one or more of the anomalous log data prediction models is a GUID and can suggest a regex replacement for those path(s).

Figure 22:
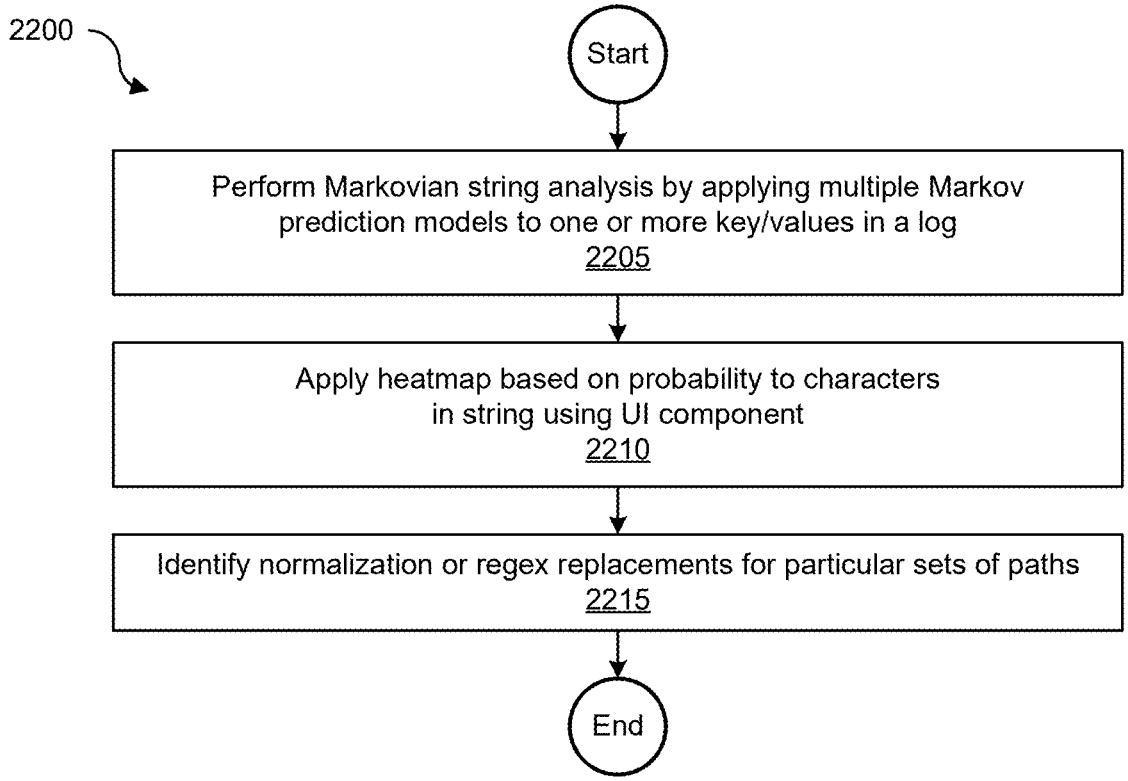
FIG. 22 is a flowchart 2200 of a process for identifying anomalous log data using Markovian prediction models, according to one embodiment of the present disclosure.

Example of Inference-Based Identification of Anomalous Log Data for Threat Hunting As described in flowchart 22 of FIG. 22, Markovian analysis engine 175 implemented by MDR server 105 performs Markovian string analysis by applying multiple Markov prediction models to one or more key/values in a log. Markovian analysis engine 175 then applies a heatmap based on probability to characters in a string (e.g., using a UI component of MDR server 105 as shown in FIG. 21). Markovian analysis engine 175 then identifies normalization or regex replacements for particular sets of paths.

In one embodiment, a log that includes a path with several strings is accessed and multiple disparate anomalous log data prediction models are trained for the path by processing one or more of the several strings at a character level and at a name level using one or more Markov prediction models that include one or more n-gram models and one or more skip-gram models after performing at least one A-replace operation. A trained dataset is then generated based on the training that includes a simplified path for each of the anomalous log data prediction models with a transition probability for each string in the path and then training other paths in the log or other logs using the trained dataset and the trained anomalous log data prediction models.

In some embodiments, the A-replace operation includes performing regular expression (regex) character replacement for one or more special characters in the plurality of strings by replacing (a) one or more alphanumeric characters, (b) one or more numbers, or (c) one or more upper case characters, one or more low case characters, and one or more numbers. Performing the regex character replacement at least identifies one or more common patterns of special characters that can include GUIDs or other types of identifiers.

Markovian analysis engine 175 also generates a character heatmap in a graphical user interface (GUI) for each simplified path processed by the (multiple) anomalous log data prediction models based on the transition probability for each string of each path. The transition probability (also called probability density) indicates a probability of characters in each string of each path and the character heatmap designates each character in each simplified path as high likelihood or low likelihood (potentially anomalous and/or malware).

In certain embodiments, Markovian analysis engine 175 receives historical log data, batches the historical log data into multiple paths, and filters the batched paths based on a single type of string of one or more types of strings that are part of the paths (e.g., a log file full of file paths for one or more customers and/or networks, and the like). In this example, the one or more types of strings include a file path and a child process (among other types of contemplated strings), the strings include key/value (KV) pairs, and the anomalous log data prediction models are configured with convolutional filters.

In some embodiments, Markovian analysis engine 175 receives a new process event, extracts a new path from the new process event, processes the new path using the trained anomalous log data prediction models that are trained using an updated trained dataset that includes several transition probabilities of several paths, generates an updated character heatmap that indicates a likelihood of each character in the new path predicted by each of the trained anomalous log data prediction models, and generates a regex replacement or normalization for (a) each of one or more new strings in the new path and (b) for one or more existing strings in the path or in other paths in the log, that creates a new simplified path for each of the trained anomalous log data prediction models.

In other embodiments, Markovian analysis engine 175 accesses the updated character heatmap, compares (and contrasts) each of the new simplified paths for each of the trained anomalous log data prediction models based on the likelihood that each character in the new path is high likelihood or low likelihood, and based on the comparing, identifies one or more new simplified paths of one or more trained anomalous log data prediction models as anomalous (e.g., identifies one or more tokens/strings as being potentially anomalous). In this manner, Markovian analysis engine 175 is able to identify anomalous log data using optimized predictive models.

ADDITIONAL EMBODIMENTS

Log2Vec: Using NLP to Extract Features and Perform Cluster Analysis from Logs

Disclosed herein are methods, systems, and processes for using natural language processing (NLP) to extract features and perform cluster analysis from logs and forensic records (referred to herein as simply "records"). It will be appreciated that a significant number of modern companies and organizations use or require the use of a Security Operations Center (SOC). A SOC includes security analysts, security software, computer hardware (e.g., to execute said security software) and other mechanisms to combat and respond to cybersecurity threats.

Examples of security software that can be provided by a SOC via physical and/or virtual computing systems and networks includes, but is not limited to: vulnerability management (VM) systems, incident detection and response (IDR) systems, penetration testing systems, application security systems (both static and dynamic), security orchestration and automation (SOAR) systems, and the like. In certain cases, a SOC is configured to perform managed incident detection and response (MDR)—which involves a company outsourcing its cybersecurity response to a third party that provides the SOC and associated capabilities and services.

In the role of a security analyst in a SOC, there are at least two key aspects of monitoring client systems and networks for malicious activity and data indicative of such malicious activity-identifying known malicious behavior occurring in such computing environments (also called threat detection) and identifying undetected malicious activity within such computing environment (also called threat hunting).

Threat hunting is an important aspect of monitoring and in some cases the only means of finding new malicious behavior and advanced threats. Threat hunting is typically performed by retrieving a large amount of forensic data from a customer's computing environment and storing the retrieved forensic data (e.g., raw logs) in a database. The database is then manipulated in various ways in an attempt to discover outliers and anomalies. These outliers and anomalies are then further investigated for potential malicious activity or behavior that can pose threats to the customer's computing environment or cause other types of harm (e.g., data exfiltration, hack attacks, loss of sensitive information, and the like).

In a typical SOC, the primary technique for threat hunting is called "Stacking." Stacking involves taking one or more fields in a database (e.g., the database discussed above) and counting the frequency of occurrence of unique values. These values are commonly arranged by count from smallest to largest. Addition investigations can be performed if a security analyst (hereinafter referred to as simply "analyst") considers any particular value suspicious.

While stacking has been shown to be effective in identifying certain threats, stacking suffers from several shortcomings: (1) stacking requires an analyst to sift through large amounts of data per stack, (2) workload increases substantially with the number of stacks, (3) visibility can be limited to only the fields that are stacked on, (4) stacking assumes that attackers will have a small footprint in the computing environment, and (5) stacking is less likely to highlight unusual inter-field relationships.

Example of Optimized Log Anomaly Detection

In one embodiment, a modified word embedding (e.g., word2vec) technique is used to convert unique word strings present in logs into vectors (e.g., logs 150(1)-(N) as shown in FIG. 1). The co-occurrence of words present in the same log is used to extract relationship information between log strings, leading the log strings to be pushed to similar areas of vector space. The word vectors are then used to create or generate vectors for each log. Cluster analysis and statistical techniques are then used on these log vectors to identify anomalous items.

It will be appreciated that while machine learning, word embedding, and statistical learning has traditionally been used to extract information and meaning from human language, the methods, systems, and processes described herein change or modify such existing systems, methods, processes, models, and techniques to identify occurrences and relationships between items in log data in information technology (IT) environments. Doing so, permits analysts to identify not only logs/records that are completely different from other logs, but also permits analysts to identify logs/records that are trying to pretend to be legitimate system artifacts or using legitimate system artifacts in an unexpected or malicious manner. It will be appreciated that the systems, methods, and processes disclosed herein also permit (and facilitate the) identification of anomalies for executables/artifacts where the cryptographic hash in unknown by anti-virus and hash scanning tools.

Figure 9:
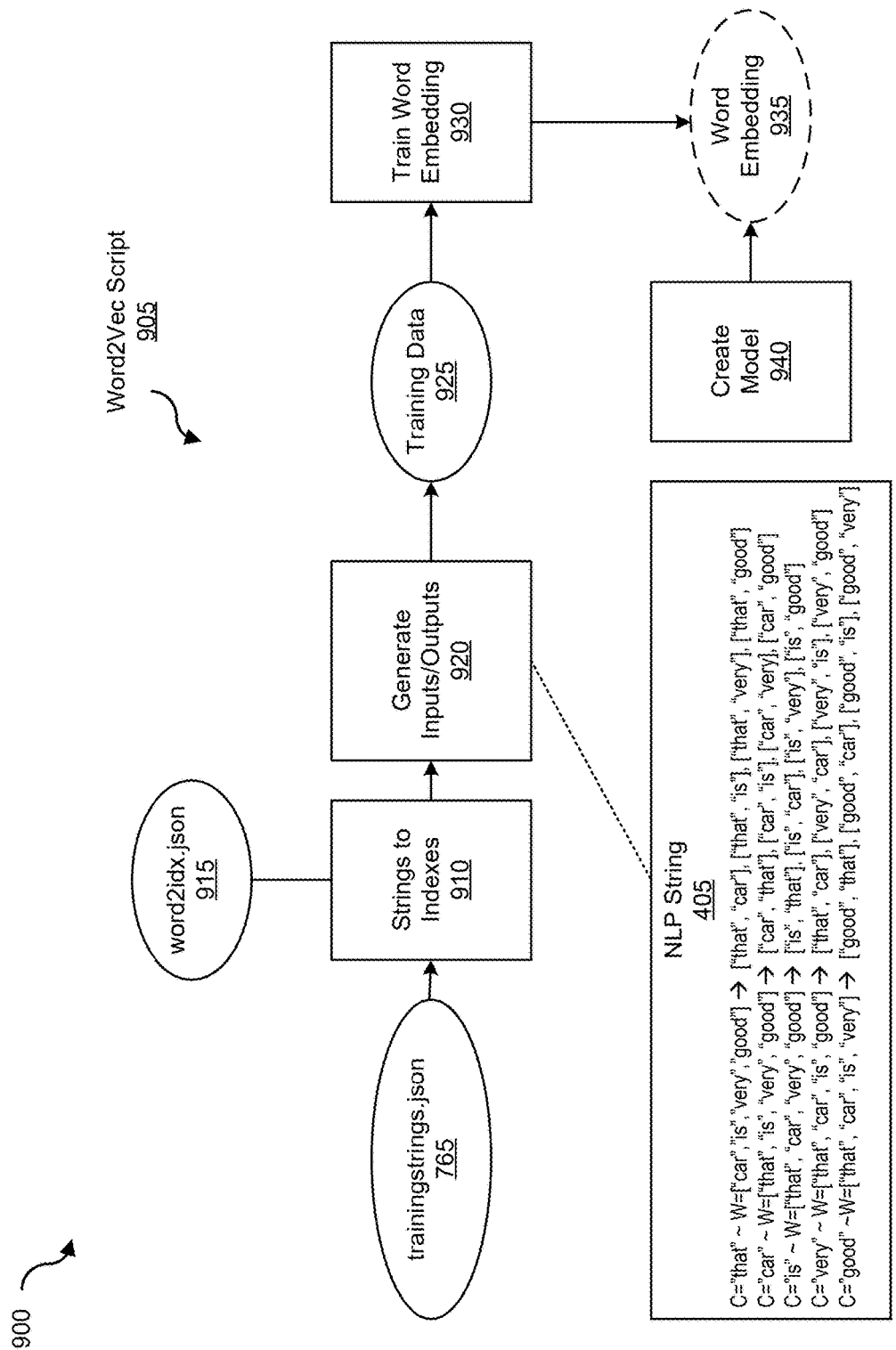
FIG. 9 is a block diagram 900 of a word embedding implementation, according to one embodiment of the present disclosure.

For example, in the event that a customer's computing environment has custom in-house software that is unrecognized by anti-virus systems, in normal circumstances, it would not be possible for an analyst to tell at a glance whether a given artifact or executable is malicious. However, with training data (e.g., training data 925 as shown in FIG. 9), a log anomaly detection engine 110 can identify anomalous attributes or usage of the foregoing in-house software that might indicate, for example, an advanced attacker.

In one embodiment, one or more machine learning models (referred to hereinafter as "models") that perform Natural Language Processing (NLP) and information retrieval paradigms such as Word2Vec and Global Vectors for Word Representation (GloVe) are applied to extract information from log data (e.g., from data from logs 150(1)-(N) produced by clients 145(1)-(N) as shown in FIG. 1). Training models with data (in an unsupervised manner) ensures that these models can learn relationships that exist between different data values.

Word2Vec (e.g., provided by a word embedding engine 125 as shown in FIG. 1) works by taking a large text corpus (e.g., the entire text of Wikipedia) and for every unique word, randomly initializing a vector with many dimensions (e.g., word vectors with 300 dimensions (or components)). A cost function is then created based on the following model: for a given string value for a center word at some point "x" in a corpus "C" (i.e., "C[x]"), the likelihood of a given string value appearing next to the center word within a certain range is determined (e.g., if the window has a length of L=3, does the outer word appear in locations "C[x−3]", "C[x−2]", "C[x−1]", "C[x+1]", "C[x+2]", "C[x+3]"?). The cost function can be used to compare randomly initialized word vectors and back propagation can be used to make incremental changes to the individual dimensions (or components) such that the dot product of the center word vector and the window word vector is as high as possible (e.g., balanced out across the corpus by performing the same operation across all center/window positions). Solving the foregoing problem across the corpus produces a minimum (zero point) for the component values of all word vectors.

In certain embodiments, log anomaly detection engine 110 implemented by an MDR server 105 performs at least five core steps and one or more combinations thereof: (1) Pre-processing, (2) Word2Vec, (3) Field2Vec, (4) Log2Vec, and (5) Cluster analysis. Each of these five steps are now discussed separately in greater detail.

Example Log Pre-Processing for Anomaly Detection

In one embodiment, log pre-processing for anomaly detection is performed by a pre-processing engine 120. In this example, log pre-processing involves converting log data (e.g., from logs 150(1)-(N) into input data required by word embedding engine 125, a field embedding engine 130, and/or a log embedding engine 135 (as shown in FIG. 1). In one embodiment, the input logs are in a consistent JavaScript Object Notation (JSON) format (but can be in any other suitable format such as Yet Another Markup Language (YAML), Protocol Buffers, AXON, ConfigObj, OGDL, Further XML Exploration, and the like).

In some embodiments, pre-processing engine 120 performs at least the following steps or operations: (1) randomly samples logs (optional), (2) generates a hash of each log to use as a unique label to use for a record such that differently pre-processed version of the same log can be tracked together, (3) removes JSON list structures by converting list components into a dictionary key/value (KV) pair where the key is an equivalent index lookup of that item (e.g., "[0]" and where the value is the item itself making it easier for the JSON to be filtered), (4) implements a filtering components that permits a user to decide which field components of the log are to be trained on based on a provided JSON filter (e.g., training filter 805 as shown in FIG. 8), providing an effective way of removing fields that would be bad for use in word embeddings (e.g., Word2Vec), such as fields that are integers.

In step/operation (5), and in certain embodiments, for each field in the log, the field's equivalent string value is broken down into substrings. This step has three sub-steps: (a) pattern matching is performed to find files, folders, and/or domains that contain spaces, and the spaces are replaced with underscores, (b) the strings are split by slash and space characters (e.g., as opposed to training entire unique paths against each other because some paths will have a random or varying folder names, each occurrence of which would be treated as a unique word to train against—by splitting the folders the parts of the paths that are consistent can be reliably trained against), and (c) the field name is combined with each unique data string.

Figure 7:
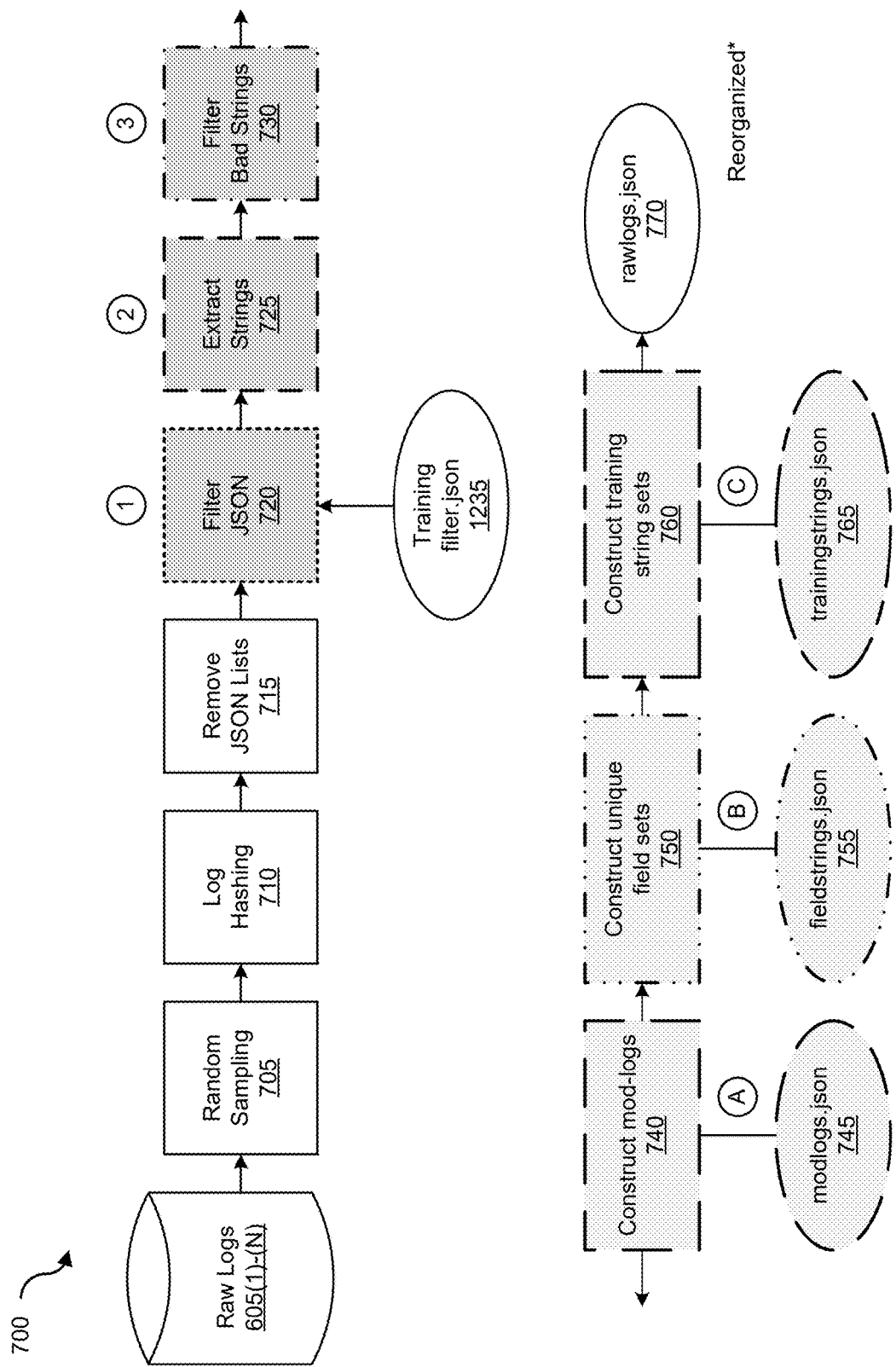
FIG. 7 is a block diagram 700 of pre-processed logs and outputs of modified logs, field strings, and training strings, according to one embodiment of the present disclosure.

In step/operation (6), and in some embodiments, each new string is compared to a list of bad strings to filter (e.g., to remove customer sensitive strings from training data such as users, hostnames, domains, and company name). In addition to anonymizing the data, this step permits trained words to be customer agnostic, ensuring that data from multiple customers (e.g., clients 145(1)-(N)) can be trained and the same vector model can be applied to multiple customers. In step/operation (7), and in other embodiments, three sets of data are outputted by the pre-processing stage (e.g., by pre-processing engine 120): (i) a set of Word2Vec input data that includes a set of unique strings per log, (ii) a dictionary mapping each unique field value identifier to (its) list of substrings, and (iii) a modified list of logs where each field is replaced by a unique identifier for that value. In the final step/operation (8), the original log data is reorganized into a dictionary where each log can be looked up by the log's unique hash label (e.g., as shown in FIG. 7).

Example Word Embedding(s) for Anomaly Detection

Figure 6:
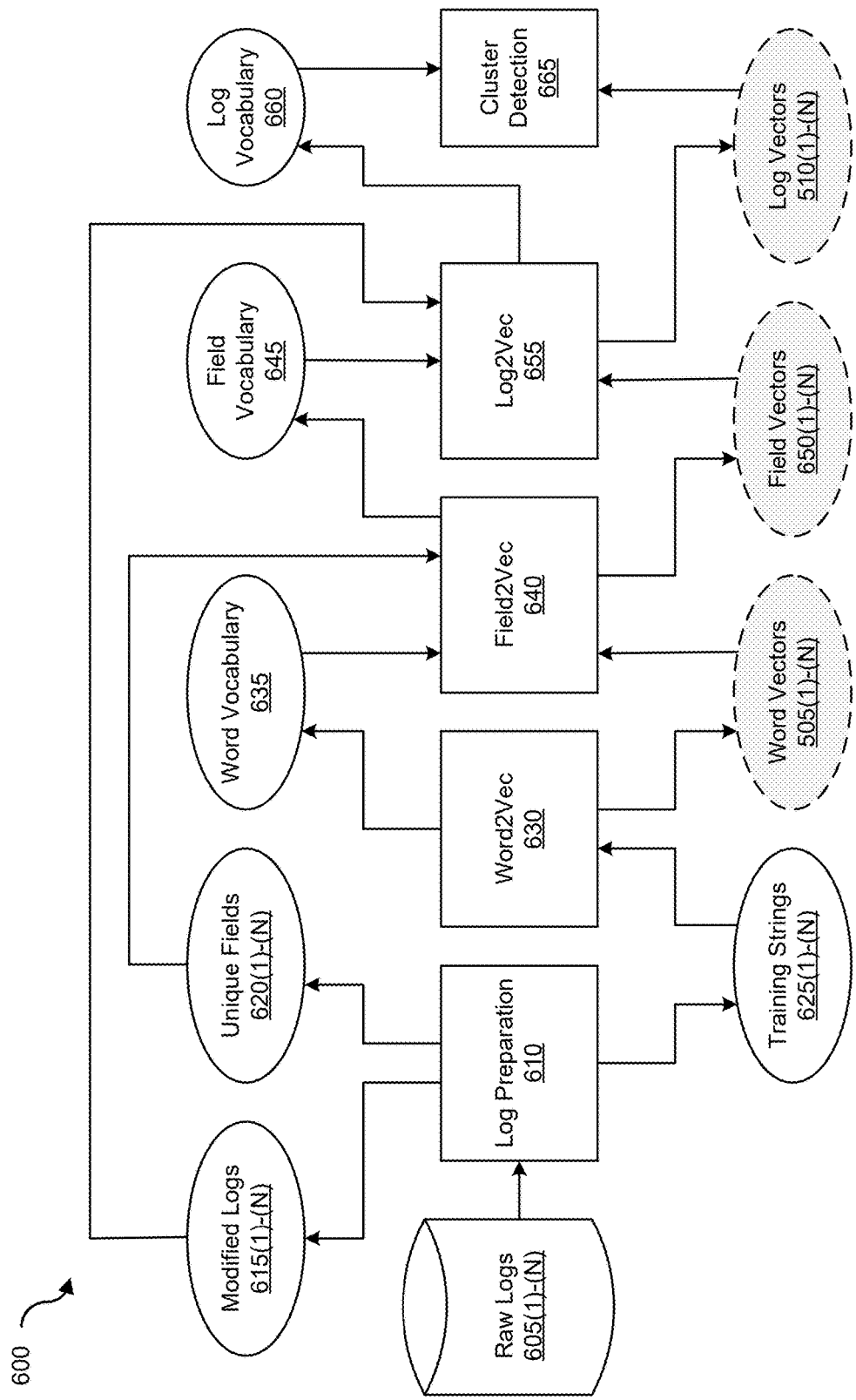
FIG. 6 is a block diagram 600 of a log anomaly detection system, according to one embodiment of the present disclosure.

In one embodiment, word embedding engine 125 accesses or receives a set of training strings as input (e.g., training strings 625(1)-(N) as shown in FIG. 6 or trainingstrings.json 765 as shown in FIG. 9). Word embedding engine 125 then builds a vocabulary (e.g., a mapping of unique strings to integer indexes to use for mapping the unique strings to a particular vector). In this example, the vocabulary is output as a .json file so that later components can easily look up the index for particular words (e.g., word2idx.json as shown in FIG. 9).

Next, the training inputs and outputs are created (e.g., generate inputs/outputs 920 as shown in FIG. 9). In one embodiment and at this stage, word embedding engine 125 is configured to perform various operations that differ from existing word2vec models. For example, existing word2vec models work from a single large corpus of text and generate training pairs by taking a given center word and a window that is +/−a certain window size from the center word. The center word and the window of the center word are then moved through the corpus and with each step, training pairs are generated. The expected inputs are the center word for the given step and the expected outputs are the words that exist in the window for the given step. The foregoing can be illustrated with an example sentence "that car is very good" with the window being +/−1 word from the center word:

[{"that"} "car"] "is" "very" "good"→C="that"~W= ["car"]→["that", "car"]→[0, 1]

["that" {"car"} "is"] "very" "good"→C="car"~W= ["that", "is"]→["car", "that"], ["car", "is"]→[1, 0] [1, 2]

"that" ["car" {"is"} "very"] "good"→C="is"~W=["car", "very"]→0 ["is", "car"], ["is", "very"]→[2, 1] [2, 3]

"that" "car" ["is" {"very"} "good"]→C="very"~W= ["is", "good"]→["very", "is"], ["very", "good"]→[3, 2] [3, 4]

"that" "car" "is" ["very" {"good"}]→C="good"~W= ["very"]→["good", "very"]→[4, 3]

In some embodiments, after the training pairs are generated, a set of randomly initialized high dimensional vectors are created for each unique word. Then, the expected input and output data is fed into an optimizer with randomly generated weights and biases. Over the course of training, the optimizer adjusts the vectors such that the vectors become the closest representation of the expected input and output data.

In other embodiments, with the modified word embedding technique disclosed herein, instead of using a sliding window to generate training pairs, word embedding engine 125 groups training data (e.g., training data 925 as shown in FIG. 9) into sets. Instead of using a sliding window, word embedding engine 125 produces training pairs for co-occurrence of any two words in that (given) set. Implementing the foregoing technique ensures that the order of strings does not matter and relationships between every string in a log is trained. For example (I being "input" and O being "output"):

I="that"~O=["car", "is", "very", "good"]→["that", "car"], ["that", "is"], ["that", "very"], ["that", "good"]

I="car"~O=["that", "is", "very", "good"]→["car", "that"], ["car", "is"], ["car", "very], ["car", "good"]

I="is"~O=["that", "car", "very", "good"]→["is", "that"], ["is", "car"], ["is", "very"], ["is", "good"]

I="very"~O=["that", "car", "is", "good"]→["that", "car"], ["very", "car"], ["very", "is"], ["very", "good"]

I="good"~O=["that", "car", "is", "very"]→["good", "that"], ["good", "car"], ["good", "is"], ["good", "very"]

I=0~O=[1,2,3,4]→[0,1] [0,2] [0,3] [0,4]
I=1~O=[0,2,3,4]→[1,0] [1,2] [1,3] [1,4]
I=2~O=[0,1,3,4]→[2,0] [2,1] [2,3] [2,4]
I=3~O=[0,1,2,4]→[3,0] [3,1] [3,2] [3,4]
I=4~O=[0,1,2,3]→[4,0] [4,1] [4,2] [4,3]

In this example, a set of randomized dense vectors, an optimizer, weights, and biases are used. The expected input/output data is fed into the optimizer and the result is a set of trained vectors, where vectors that commonly co-occur with each other occupy a similar area of vector space. In one embodiment, a machine learning framework such as TensorFlow is used for vector manipulation. In this example, the Noise Contrastive Estimation learning technique and the Adam optimizer is also used. It should be noted that in other embodiments, alternate or other machine learning frameworks, learning techniques, and optimizers are also contemplated. The final output of the word2vec or word embedding component is a TensorFlow model (or a comparable model generated from another machine learning framework) with a word embedding tensor (e.g., a word embedding that is a list of word vectors by index and is effectively a matrix).

Example Field Embedding(s) for Anomaly Detection

In one embodiment, the inputs for field embedding engine 130 (e.g., the field2vec component) is a dictionary set that maps identifiers for unique fields to a list of substrings for that field, the word to index vocabulary, and the TensorFlow word embedding. In this example, the word vectors for each unique field are summed up (or added) and a field vector is obtained that contains the relationship information of substring components. First, a vocabulary is generated by log anomaly detection engine 110 that maps the identifiers for unique fields to an integer index that can be used to look up (or reference) the field vector in the field embedding.

Figure 11:
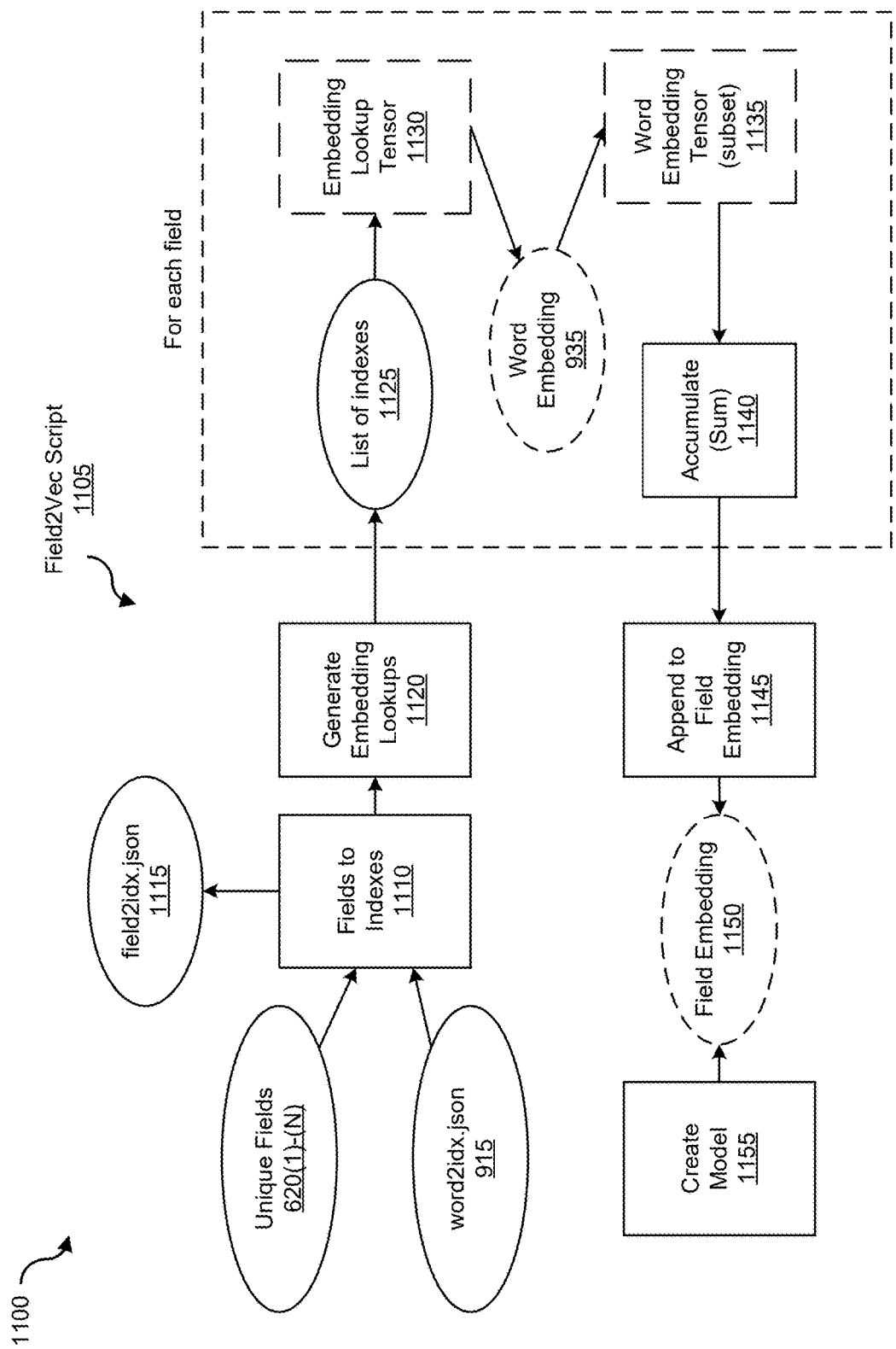
FIG. 11 is a block diagram 1100 of a field vector implementation, according to one embodiment of the present disclosure.

Next, the dictionary that maps unique field value identifiers to the list of substrings is accessed and the list of substrings is converted into a list of indexes (e.g., list of indexes 1125 as shown in FIG. 11) to look up in the word embedding (e.g., to identify corresponding word vectors). In this example, log anomaly detection engine 110 uses the foregoing lists as word embedding lookups (e.g., as shown in FIG. 11).

In some embodiments, list of indexes 1125 uses a machine learning framework vector (e.g., as an embedding lookup vector). Also, because an embedding lookup vector exists for each unique field identifier, an embedding lookup tensor is created (e.g., a list of embedding lookup vectors). In this example, the vectors in the tensor are arranged based on the index of their corresponding unique field identifiers.

Maintaining lookups in tensor form (e.g., embedding lookup tensor 1130 and embedding lookup tensor (subset) 1135) optimizes look ups for easier and faster manipulation with machine learning frameworks such as TensorFlow. However, one shortcoming that exists with the foregoing mechanism is that there is no consistency to the length of the embedding lookup vectors. In a framework such as TensorFlow, tensors with inconsistent shape are called "ragged" tensors on which operations cannot be performed.

However, in certain embodiments, one or more methods can be used to convert a ragged tensor to a regular tensor (e.g., using a technique called masking). However, in this example, since the indexes in the lookup vectors are going to be used to look up word embeddings, a slightly different approach is used. In one embodiment, each embedding lookup vector is configured to be the same length of the longest lookup vector and the shorter lookup vector is padded with an index to a "zero lookup" (e.g., a lookup to a zero vector-a vector of the same length with values set to zero). Therefore, when the sum of the word vectors output by the word embedding lookup is calculated, the zero vectors do not affect the sum. To configure the foregoing, in one embodiment, the zero vector is added to the end of the word embedding.

In some embodiments, to create the field vectors, TensorFlow's map_fn operation is used. The foregoing operation receives a tensor and a sub-operation as input, breaks up the inputted tensor into sub-tensors with shapes of the lowest dimension, performs the sub-operation on each, and then re-combines the results. In the case of the embedding lookup tensor, the foregoing function splits the tensor into individual embedding lookup vector and performs an operation on each, and then re-combines the results. For each embedding lookup vector, the following operations or steps are executed: (a) performing an embedding lookup on the word embedding, (b) receiving a tensor that is the subset of word vectors, (c) summing (or adding) the tensor vectors across the components, and (d) optionally, normalizing (average) the field vector.

In some embodiments, the output of the foregoing operation(s) is a field vector (e.g., field vector 650(1)) (e.g., for each loop of the map_fn function, a field vector is generated). Then, at the end of the loop, the generated field vectors are automatically combined into a tensor, which in this example, is the field embedding tensor. In this example, the field embedding tensor is the final output of the Field2Vec component (e.g., implemented by field embedding engine 130 as shown in FIGS. 1A and 11).

Example Log Embedding(s) for Anomaly Detection

Figure 13:
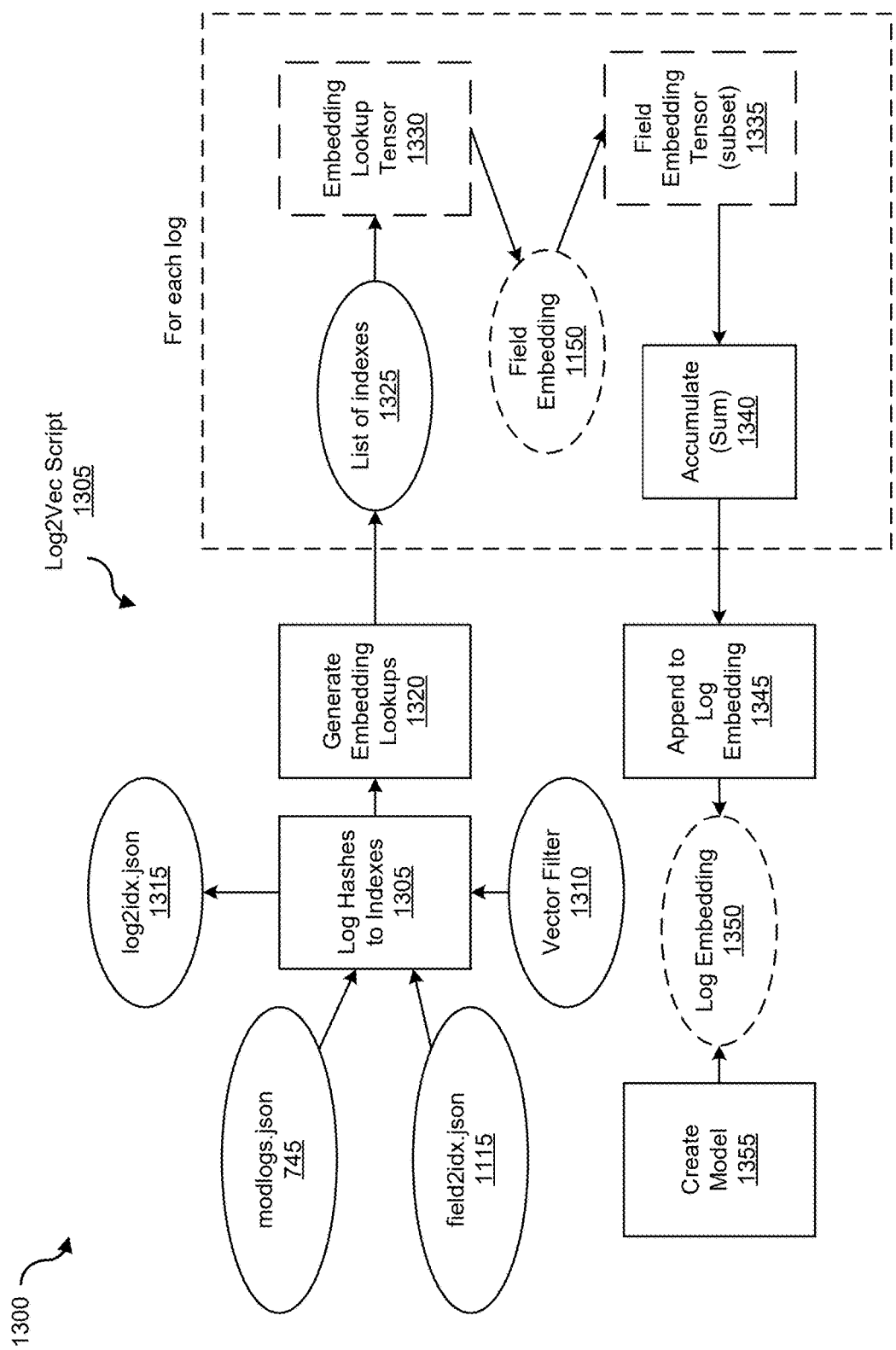
FIG. 13 is a block diagram 1300 of a log vector implementation, according to one embodiment of the present disclosure.

In one embodiment, the inputs for log embedding engine 135 are the dictionary field embedding tensor (e.g., log2idx.json 1315 as shown in FIG. 13), the vocabulary/dictionary that maps identifiers for unique fields to an integer index, and the dictionary that maps log hashes to a modified log structure (e.g., where field values are unique identifiers).

In certain embodiments, the purpose of log embedding engine 135 is to generate log vectors for each log from the sum of the given log's corresponding field vectors (e.g., as shown in FIG. 13). In some examples, the implementation for summing field vectors and collating log vectors is similar to the field embedding engine 130. However, in some embodiments, before the summing and collating is performed, log embedding engine 135 applies a filter to the modified log's input to further filter fields. This permits users to train on the word vectors for a broad variety of fields (less filtered). Then, at a later stage, user(s) can remove the vector component of particular fields when performing cluster analysis.

Example Cluster Analysis for Anomaly Detection

In one embodiment, the inputs for cluster analysis engine 140 are the reorganized raw logs, the dictionary/vocabulary that maps log hashes to integer indexes, and the log embedding tensor. In this example, using the data in the raw logs, cluster analysis engine 140 splits the log vectors by unique process names. These log vector subsets can be treated as their own tensors and statistical analysis can be performed on the (log) items. In addition, the map_fn function (or any similar or comparable function of another machine learning framework other than TensorFlow) can be used to sum (or add) the log vectors in a subset and then an average log can be created for that (given) subset by dividing the log by the scalar count of the logs in the subset.

Once an average log is obtained, cluster analysis engine 140 accesses the log subset for a given process and calculates either the cosine or Euclidean distance between each log vector and the average log vector. For anomaly detection, and in some embodiments, logs that are farthest from the center of the cluster are of particular interest. For example, because many of the process strings for the executable will (likely) be the same, it is also likely that the vector for the process log will be close to the given cluster (e.g., the cluster under analysis). To consider and cover the foregoing cases, and in other embodiments, cluster analysis engine 140 uses the set of distances to calculate the standard deviation of the distance from the cluster. Consequently, the tensor can be accessed for (all) log vectors and the distance between (all) logs and the (given) average log can be calculated. The results can then be filtered to the vectors that are within a pre-determined number of standard deviations of distance.

In certain embodiments, the foregoing cluster analysis process can be performed with a MD5 hash field (e.g., it does not have to be performed with just the process name field, as described above). In addition, and in some embodiments, the most unusual process clusters in a given computing environment can be identified by considering at least two additional factors. First, the number of occurrences for a given process Name/Hash can be determined. Second, the distances between all clusters can be determined and the clusters farthest away from the rest can be identified. Although the processing for the second factor can be computationally expensive if the number of clusters significantly increases, other computationally efficient processes such as Random Forest can be implemented to determine 'how' abnormal a given cluster is.

OTHER EXAMPLE EMBODIMENTS

It will be appreciated that the methods, systems, and processes disclosed herein permit managed detection and response analysts in a SOC to visualize clusters of logs to visually identify anomalies and/or permit computation-based identification of anomalies in clusters. The time required for threat hunting is thus likely reduced, leading to potentially faster hunts and the 'most' suspicious log data can be displayed to the analyst in a timely manner.

Figure 1B:
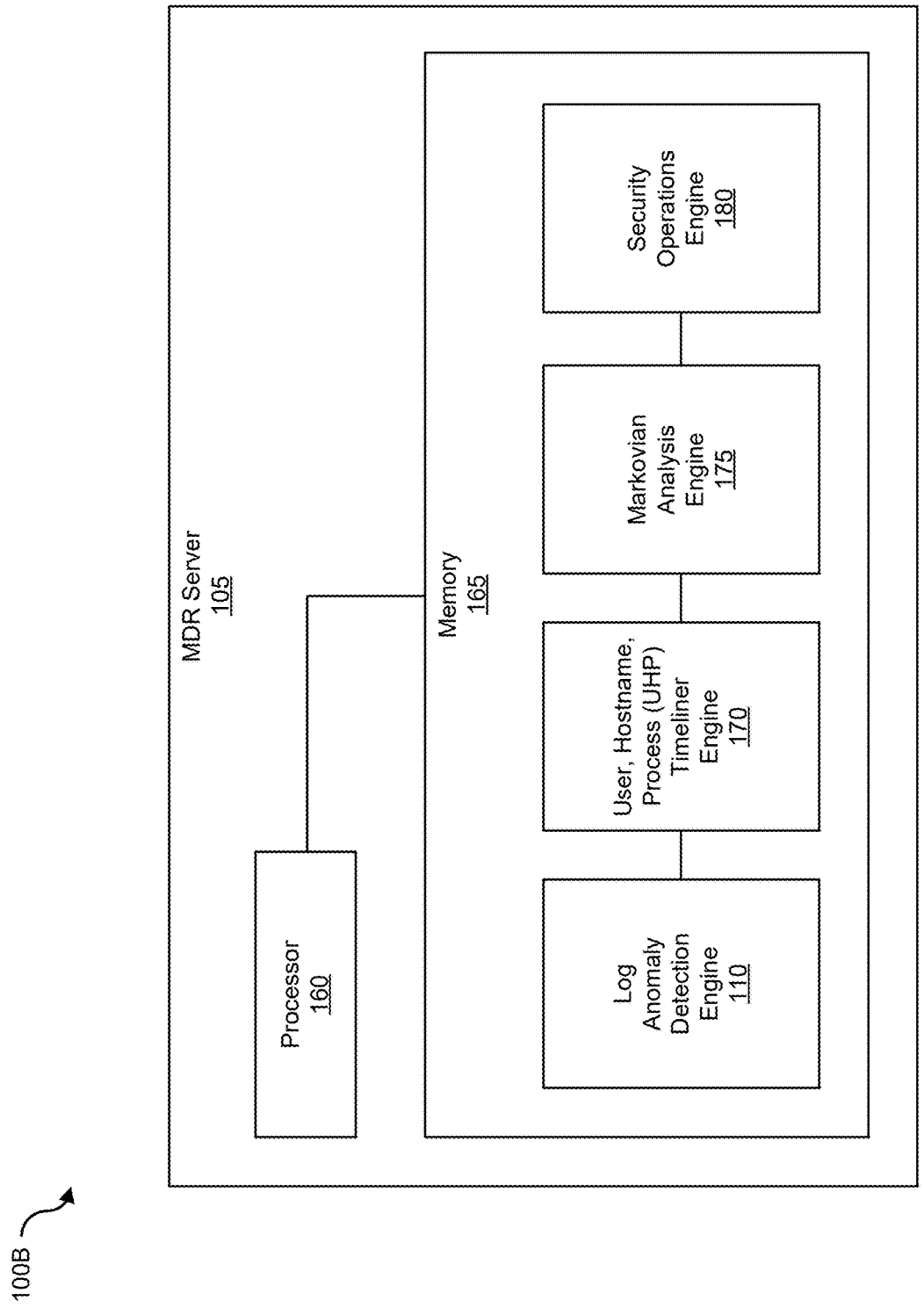
FIG. 1B is a block diagram 100B of a MDR server that implements a log anomaly detection engine, a user, hostname, process (UHP) engine, a Markovian analysis engine, and a security operations engine, according to one embodiment of the present disclosure.

The methods, systems, and processes disclosed herein use natural language processing (NLP) to enable MDR server 105 to detect and analyze log and forensic data for anomalies and visualize the results of the analysis (e.g., as shown in FIG. 1B).

In one embodiment, the script used to detect, analyze and visualize anomalies in log data is log agnostic. Any one or more of a number of log sources can be part of logs 305(1)-(n). In some embodiments, when the data is summed or aggregated, the data is normalized. This is because the final position in vector space of a log can be significantly affected by just how many unique strings they have. For example, if there are two sets of similar winword logs, and one set has 15 unique strings and another set has 20 unique strings, even if those strings are the same, the two sets can form into different clusters. However, in certain embodiments, if instead of a sum, an average is performed, the two sets can become one in vector space. This is particularly useful in the instant situation because log anomaly and detection is more interested in strange or unusual relationships between strings, rather than how many strings a given log has.

In other embodiments, other word vectorization models such as Global Vectors for Word Representation (GloVe) are contemplated. In this example, instead of sending individual training pairs (or batches of training pairs) to an optimizer (e.g., part of word embedding engine 125), a sizeable part of preprocessing generates a large co-occurrence matrix. Providing this co-occurrence matrix to the optimizer can be more efficient.

In some embodiments, various hyperparameters that can affect the success of information retrieval are contemplated (e.g., the number of dimensions for dense vectors). In a typical NLP use case, the recommended size is around 200-300 dimensions (e.g., because of diminishing returns after 400 dimensions). In one embodiment, a testing metric is implemented that permits the determination of success of training against a set of logs. In this example, this training 'success' can be measured with just the vectors (e.g., by using linguistic examples of relationships between words-vector differences between different tenses of a verb, and the like).

Therefore, the question of how well certain parameters positively or negatively affect vector relationships can be tested (and determined) by looking at and analyzing the variation of distance for these relationships. Similar examples can be set up for logs (e.g., determining vector difference between 32-bit processes and 64-bit processes, and the like). Alternatively, the success of parameter combinations can also be tested by feeding vectors into a log classifier and determining how the success of the classifier changes with vectors that have been generated with different parameter sets.

In one embodiment, field embedding engine 130 generates custom weights for particular JSON fields. For example, the primary influence for training can be two particular fields while the rest of the fields can be configured to have a minimum amount of training (e.g., prioritizing processName, md5 and cmdLine fields over other fields in process logs). In other embodiments, log vectors are fed into more complex machine learning tasks such as classifiers or Recurrent Neural Networks.

Examples of Natural Language Processing (NLP) for Log Anomaly Detection

In certain embodiments, (a) Natural Language Processing (NLP) includes one or more techniques for extracting data from natural language, (b) Vector means a point in space represented by numbers (e.g., x=1, y=2, z=3), (c) Embedding is a 'Vector,' (d) Tensor is a set of points in space that can be represented by a matrix, (e) Word2Vec is an algorithm for turning words into vectors, (f) Cluster is a collection of items that have similar properties, (g) Standard Deviation is a statistical method of measuring the size of a distribution/cluster, (h) TensorFlow is a machine learning framework, (i) PCA is Principal Component Analysis, and (j) T-SNE is t-Distributed Stochastic Neighbor Embedding.

In cybersecurity computing environments, threat detection involves the following characteristics: the source for threat detection is previous malicious activity, the activity follows a known pattern, rules can be built (e.g., alerts can be generated whenever activity occurs), and alerts are direct leads for investigations (e.g., by a SOC analyst). On the contrary, threat hunting involves the following characteristics: there is no source for threat hunting, activity follows an unknown pattern, rules cannot be built, computing and networking environments must be searched for new and unknown behaviors, and hunting attempts to generate investigation leads for SOC analysts from computing and networking environment data.

Threat hunting (or simply 'hunting') involves accessing or retrieving available data in a computing/networking environment (e.g., collating log data for a time period, retrieving forensic data from endpoints, and the like), manipulating the data in some manner (e.g., identifying locations commonly associated with malicious activity, identifying unique items (e.g., stacking), and the like), identifying some sort of anomaly (e.g., manually), and investigating said anomalies (e.g., time consuming, reserved only for high confidence items).

Figure 25:
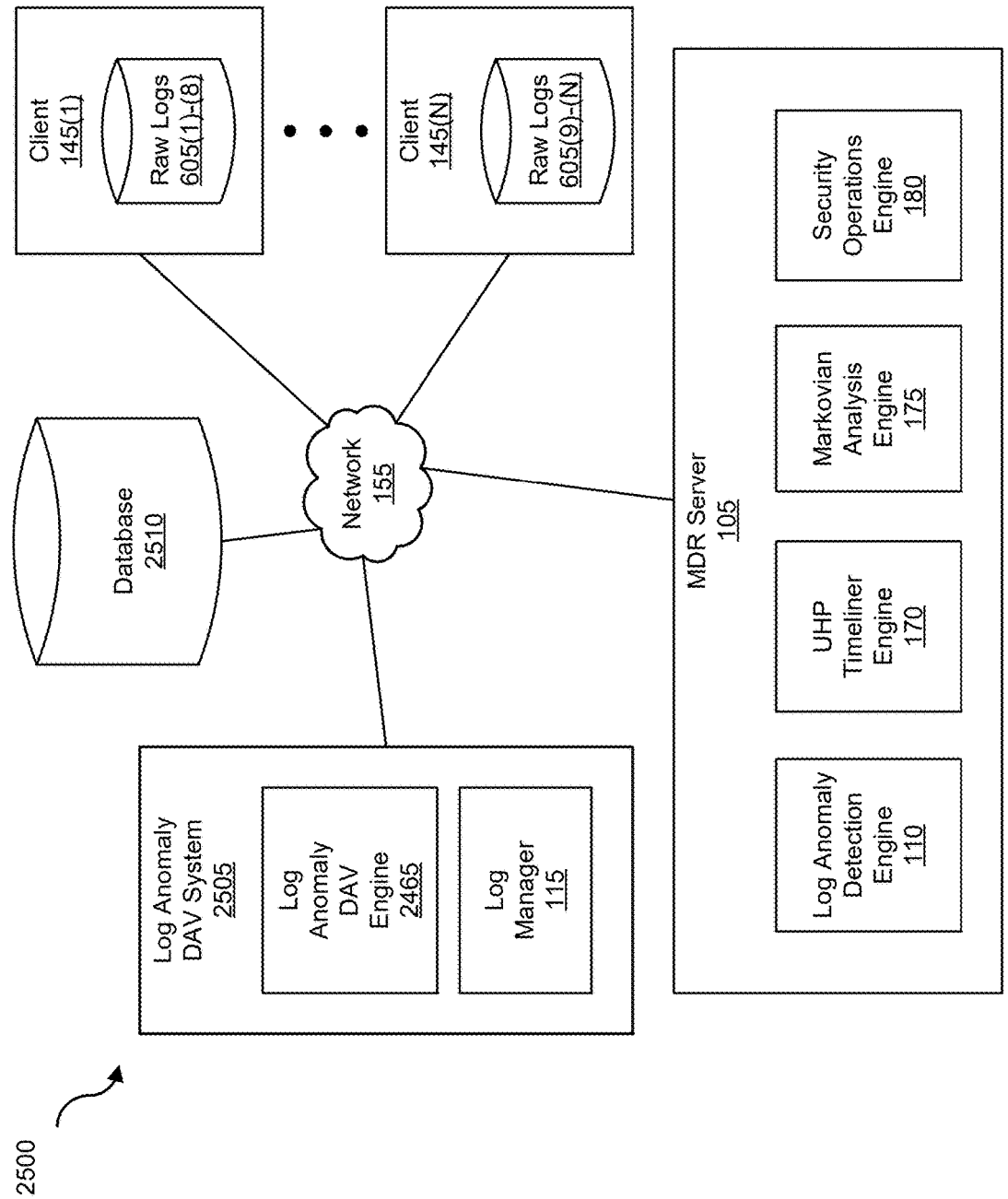
FIG. 25 is a block diagram 900 of a networked system, illustrating how various devices can communicate via a network, according to one embodiment of the present disclosure.

In certain embodiments, hunting includes collecting forensic artifacts from endpoints and mining log data for report CSVs (comma-separated values). The forensic records are stored in a database (e.g., database 2510 as shown in FIG. 25) and the database is queried with stacking queries. The stacks are then examined. For example, in some embodiments, the (computing and/or networking) environment data gathered by MDR server 105 is the output of various forensic tasks from various computing assets (e.g., physical computing devices and/or virtual computing devices). The data is then parsed and stored in the database. A field range is chosen and the unique values are arranged for that (given) field by frequency of occurrence (e.g., to focus attention on field values that are uncommon in the environment because malicious attackers can often leave a small footprint).

The benefits of stacking include the ability to target fields most likely to identify or detect malicious behavior, the ability to prioritize records with unique values, and the ability to spot a complete irregularity (e.g., a randomized string). The negatives of stacking can include too much data, an increase in workload with the number of stacks, limited visibility only to stacks, and the need for an assumption that attackers will have a small imprint in the environment. For example, attackers filling fields with bad data or typos can be caught by stacks (e.g., particularly in the subset of malicious processes where every field in unique). Therefore, stacking is good for looking at known fields that commonly reflect anomalous behavior, giving items a priority (unique values are more valuable than common values), and spotting malicious attackers who fill in fields with easy to spot bad data and/or make typographical errors.

In a first example, an attacker can decide that they want to disguise a malicious file called bad.exe as Chrome.exe. The attacker changes name to Chrome.exe and replaces the Chrome.exe in C:\Users\(user account) \AppData\Local\Google\Application with no command line arguments, a salted hash, and falsified metadata (e.g., company name). Judging such disguised malicious files becomes difficult the less well known (and bland) the process that is being imitated (e.g., it would be really difficult to judge an attacker pretending to be an obscure third party application or in-house custom software). In a second example, an attacker can also use PowerShell in a manner than anti-virus does not detect by renaming PowerShell to Chrome.exe where CmdLine arguments are <<regular chrome args>>+ <<malicious powershell>>. In this example, the hash is valid and the metadata is already valid.

In a third example, an attacker can disguise a malicious file called bad.exe as Winword.exe. In this example, the bad file names itself Winword.exe (changes metadata information to reflect Winword), replaces winword.exe executable (e.g., in C"\Program Files(x86)\Microsoft Office\root\Office16), and changes command line arguments to look winword-like (e.g., opening particular documents). The hash is salted. However, in this example, the relationship between fields and hash is anomalous and there is a non-existent signing chain or incorrect signing chain (e.g., signed by Bad.co).

In a fourth example, an attacker disguises powershell.exe as Winword.exe. In this example, the attacker changes the name to Winword.exe (no need to change metadata) and replaces the winword.exe executable in C"\Program Files (x86) \Microsoft Office\root\Office16. There are no command line arguments ("live" shell) and the hash is unchanged (e.g., will not appear on a Reversing Lab unknown). However, in this example, the relationship between the winword process name the powershell fields is anomalous.

One problem with respect to detecting anomalies in log data is that it is relatively easy to determine that a record is unique overall but challenging to arrange data in a manner that prioritizes records with common strings and one or two unique strings. In one embodiment, log anomaly detection engine 110 configures word embedding engine 125 to generate a machine learning algorithm that can be used for NLP. Word embedding engine 125 transforms words into vectors where the vectors capture word relationships. In this manner, word embedding engine 125 identifies synonyms between words. In some embodiments, the machine learning algorithm of word embedding engine 125 is trained over a large text (e.g., Wikipedia) and turns words into "dense" vectors (e.g., with 100 to 500 dimensions). Therefore, words that commonly occur next to each other in the text will be closer to each other in vector space.

FIG. 1A is a block diagram 100A of a managed detection and response (MDR) server and FIG. 1B is a block diagram 100B of a MDR server that implements a log anomaly detection engine, a user, hostname, process (UHP) engine, a Markovian analysis engine, and a security operations engine, according to certain embodiments. MDR server 105 can be any type of computing device (e.g., a physical computing device or server with a processor and memory) and implements log anomaly detection engine 110.

Log anomaly detection engine 110 includes log manager 115 (e.g., for receiving, organizing, and managing log data from raw logs or other comparable forensic records), pre-processing engine for performing log pre-processing (as discussed above), word embedding engine 125 (e.g., to implement Word2Vec), field embedding engine 130 (e.g., to implement Field2Vec), log embedding engine 135 (e.g., to implement Log2Vec), and cluster analysis engine 140 (e.g., to perform cluster analysis after a combination of the pre-processing, word2vec, field2vec, and log2vec processes discussed above). MDR server 105 is communicatively coupled to clients 145(1)-(N) via network 155 (which can be any type of network or interconnection). Clients 145(1)-(N) each include one or more logs (e.g., logs 150(1)-(10) from client 145(1), logs 150(11)-(30) from client 145(2), and the like). The logs are retrieved from clients 145(1)-(N) by log manager 115 or sent to log manager 115 by clients 145(1)-(N).

MDR server 105 includes a processor 160 and a memory 165. As shown in FIG. 1B, memory 165 implements at least log anomaly detection engine 110, and in addition, or optionally, a user, hostname, process (UHP) timeliner engine 170, a Markovian analysis engine 175, and a security operations engine 180. Log anomaly detection engine 110, UHP timeliner engine 170, and Markovian analysis engine 175, either alone or in combination, enable MDR server 105 to perform optimized log anomaly detection, analysis, and visualization.

Figure 2:
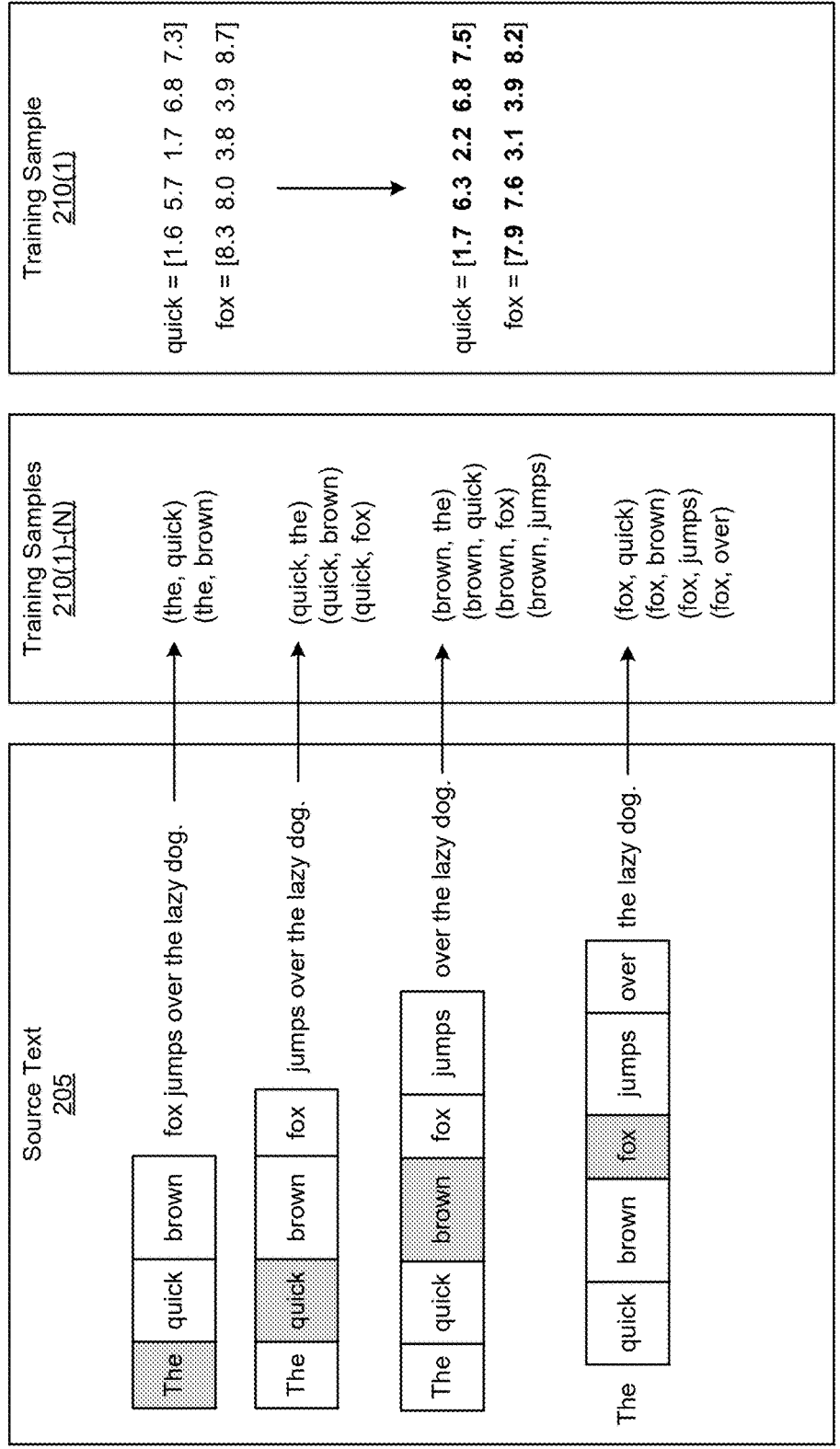
FIG. 2 is a block diagram 200 of a word embedding model for natural language processing (NLP), according to one embodiment of the present disclosure.

FIG. 2 is a block diagram 200 of a word embedding model for natural language processing (NLP), according to one embodiment. Word2Vec (which is an example of a word embedding model), goes through each word of text and uses the word as the center word (e.g., a certain window sizing of +/−3 words from the center word can be used). Each word vector is randomly initialized at the start and each center/ window word co-occurrence is a Loss function (e.g., the likelihood of "quick"→"fox"). Word embedding engine 125 can minimize the loss problem across words and training samples, although there are certain sets of values for word vectors that cannot be further minimized.

Figure 3A:
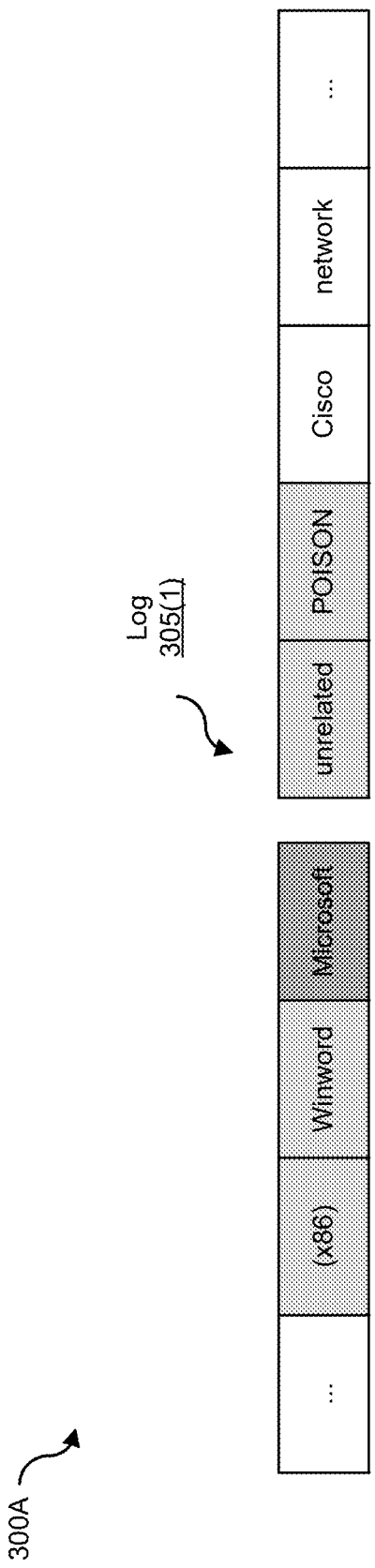
FIG. 3A is a block diagram 300A of a log shown as continuous text, according to one embodiment of the present disclosure.
Figure 3B:
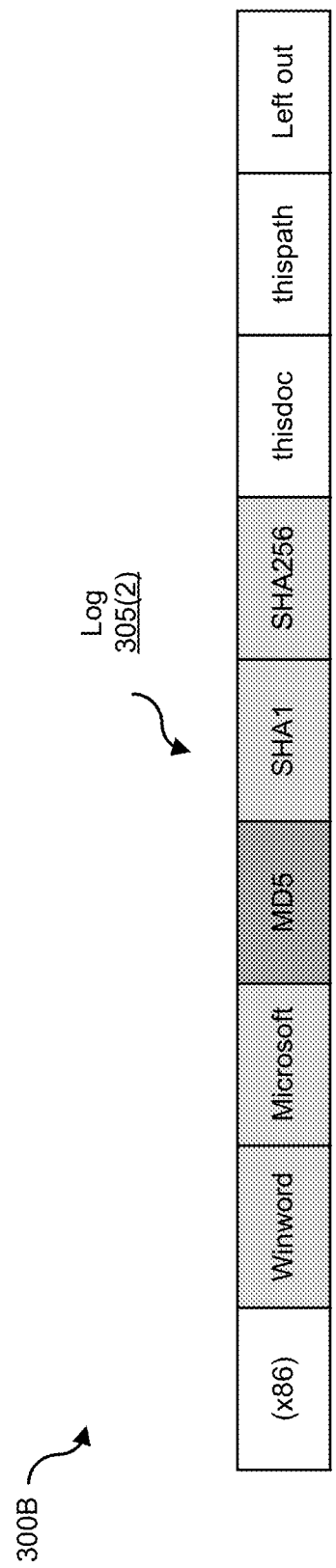
FIG. 3B is a block diagram 300B of a log with a window size smaller than the log, according to one embodiment of the present disclosure.

FIG. 3A is a block diagram 300A of a log shown as continuous text and FIG. 3B is a block diagram 300B of a log with a window size smaller than the log, according to some embodiments. As shown in FIG. 3A, one problem is that if logs are treated as continuous text, inter-log relationships will be trained. As shown in FIG. 3B, another problem is that if a window size is smaller than the log, relationships can be missed. Logs can however be turned into a large continuous text of strings. Unfortunately, doing so results in a center word at the end of a log that will have a window that overlaps into the next log, poisoning relationships. In addition, with a small window, relationships between front and end strings of the log will not be trained. In this manner, Word2Vec can be applied to logs.

Example of Modified Word2 Vec Output

In certain embodiments, Word2Vec is modified by word embedding engine 125 by training every string in a lot with every other string in that log. In this example, applying Word2Vec to logs involves a minor modification to word2vec. In one embodiment, the window for any given center word is the entire log (or sentence). FIG. 4 is a block diagram 400 of a modified word embedding model, according to one embodiment. NLP string 405 illustrates an example of center/window word sets for "that car is very good." FIG. 4 also illustrates the example contents of log 305(n) and a modified word embedding 410.

Figure 5:
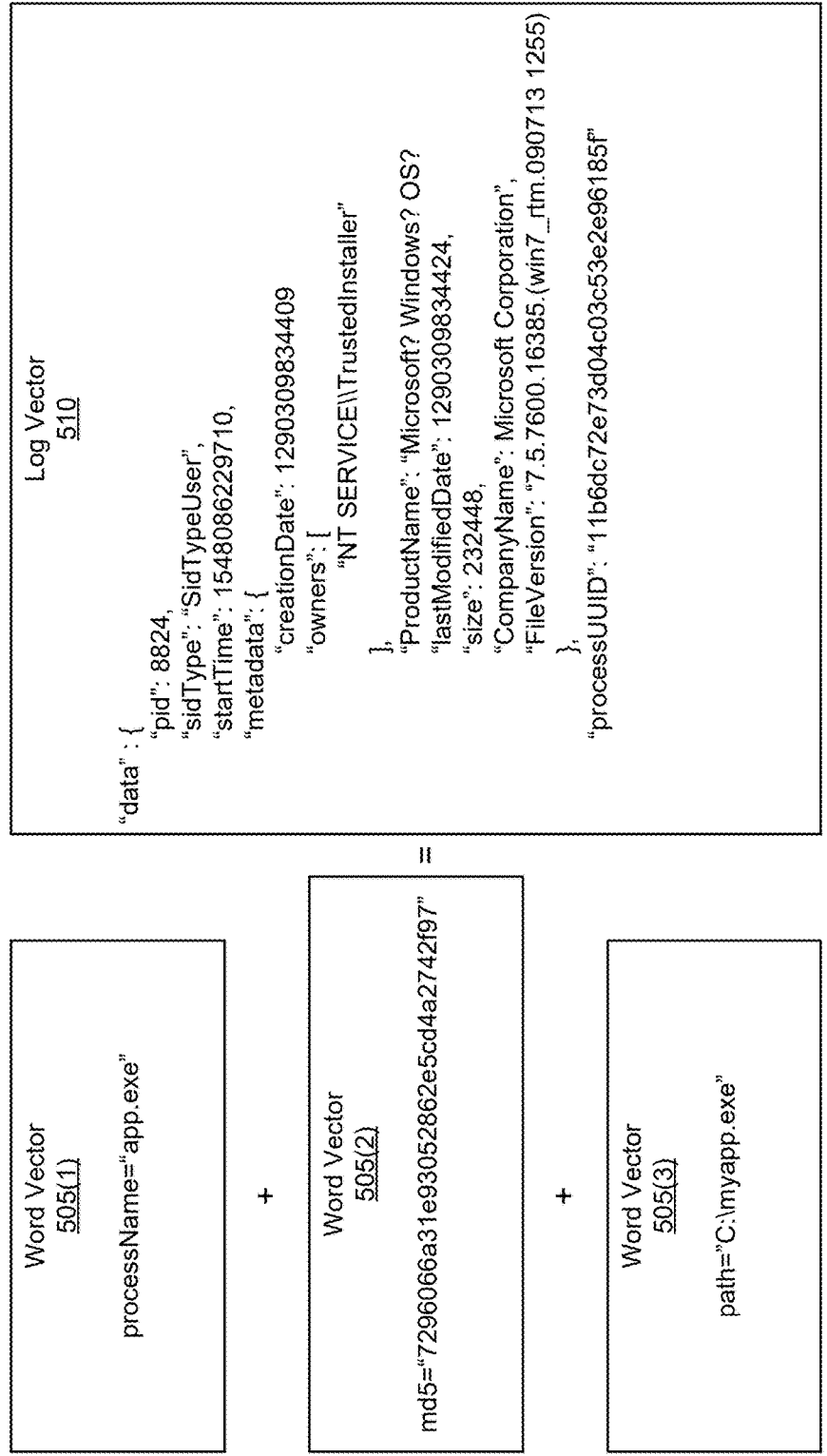
FIG. 5 is a block diagram 500 of summed word vectors, according to one embodiment of the present disclosure.

FIG. 5 is a block diagram 500 of summed word vectors, according to one embodiment. Word vectors 505(1)-(3) when summed, results in log vector 510. Word2Vec produces a set of vectors for each string (e.g., "Winword.exe")—however, this is not very useful for threat hunting. On the other hand, and in certain embodiments, a vector version of logs is generated by listing unique strings in a log, summing all vector values for strings, and normalizing the log vectors. Because vector representation of logs are desired, vectors for each unique string in a log set are accessed by log anomaly detection engine 110 and for each string in a log-its word vector representation is generated/derived. Then, the word vectors are summed to the log vector (e.g., log vector 510 as shown in FIG. 5).

Example of Log Vector Clustering

Multiple instances of vectors that are similar to each other tend to form into clusters. In one embodiment, log anomaly detection engine 110 performs log vector clustering. Logs that are similar will group together and logs for the same processes can (nearly always) contain the same strings. Strings in the log should have trained relationships and log clusters will form in vector space. Anomalous logs will be the farthest outliers for a given cluster.

Example of Clustering Statistics

In one embodiment, logs are filtered to a subset (e.g., logs where processName="winword.exe". The average "winword.exe" log is determined and the average log is represents the center of the cluster. The distances of "winword.exe" logs from average is determined (e.g., the distance should be a Normal distribution). The standard deviation is then determined and the "winword.exe" logs starting with those that are the furthest away (e.g., the anomalies) are listed.

Example Benefits of Log Vectors for Threat Hunting

It will be appreciated that logs for the same processes should nearly always contain the same strings. Since these strings have co-occurred, they should have similar components. For example, the log vector for "winword.exe" is pushed to a very "winword" part of vector space. If a log contains an in appropriate non-winword string, then the log vector will be pulled away from the rest. Consequently, anomalous logs will be "X" number of standard deviations away from the center of the cluster.

Example Diagrams of Log Anomaly Detection Computing Systems

FIG. 6 is a block diagram 600 of a log anomaly detection system, according to one embodiment. The log anomaly detection system includes at least raw logs 605(1)-(N), log preparation 610, modified logs 615(1)-(N) (e.g., after the pre-processing), unique fields 620(1)-(N), training strings 625(1)-(N), word2vec 630, word vocabulary 635, word vectors 505(1)-(N), field2vec 640, field vocabulary 645, field vectors 650(1)-(N), log2vec 655, log vocabulary 660, log vectors 510(1)-(N) and cluster detection 665.

FIG. 7 is a block diagram 700 of pre-processed logs and outputs of modified logs, field strings, and training strings, according to one embodiment. In one embodiment, FIG. 7 illustrates a log pre-processing script (e.g., (1) filter JSON 720 (e.g., using a training filter 805 as shown in FIG. 8), (2) extract strings 725, and (3) filter bad strings 730 as shown in FIG. 7). For example, string values are broken down by spaces and slashes. For a simple field like processName, there is only one string. For complex fields like path or cmdLine, there are a list of strings (e.g., "executablePath←C:", "executablePath←Windows", "executablePath←findstr.exe"). Complex regex is used to capture folders/files with spaces and the spaces are replaced with underscores.

Further, as shown in FIG. 7, the log anomaly detection system constructs mod-logs 740 (e.g., (A) modlogs.json), constructs unique field sets 750 (e.g., (B) fieldstrings.json), and constructs training string sets 760 (e.g., (C) trainingstrings.json)—outputs of modlogs, fieldstrings, and output training strings, respectively.

Figure 10:
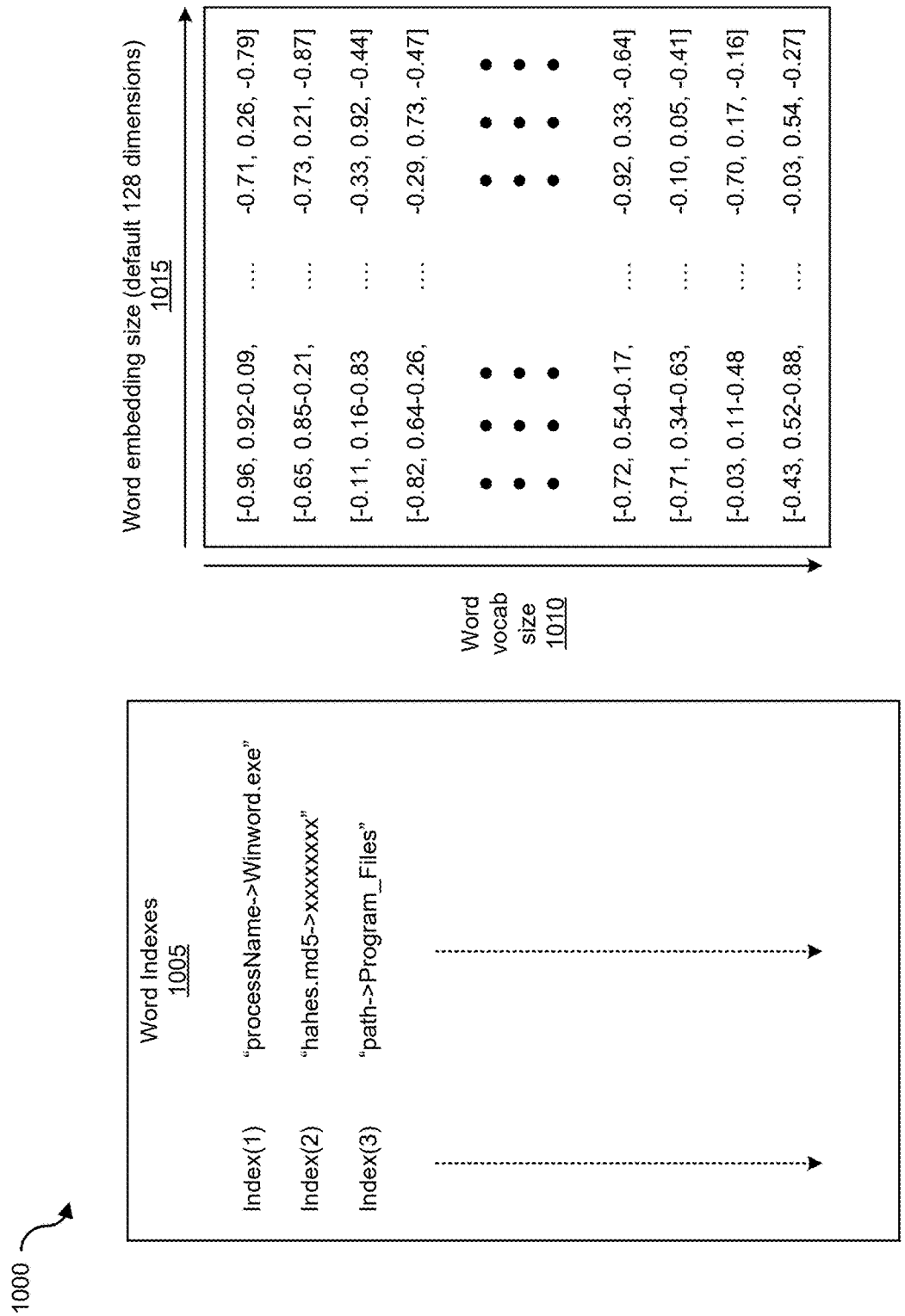
FIG. 10 is a block diagram 1000 of word vectors, according to one embodiment of the present disclosure.
Figure 12:
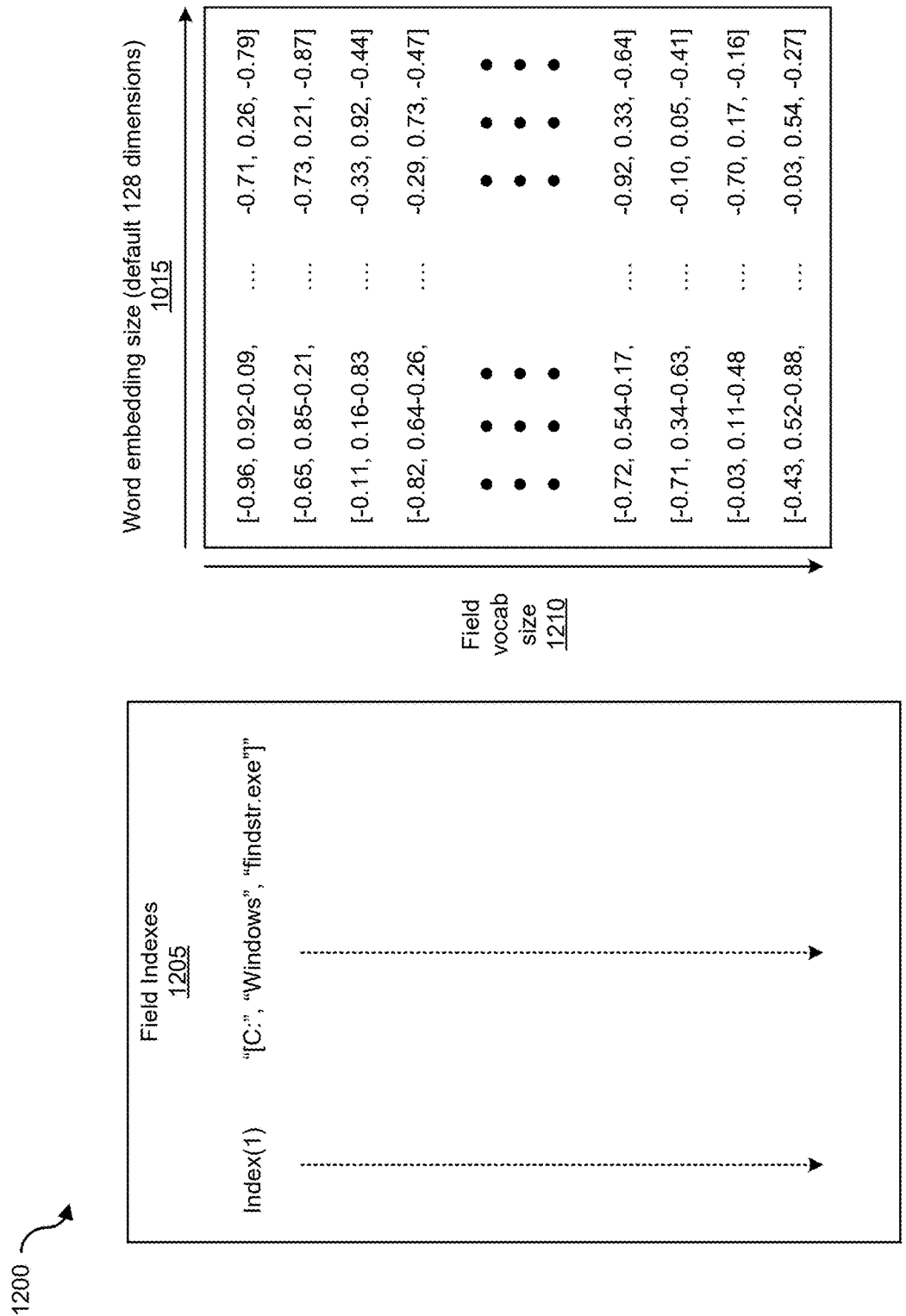
FIG. 12 is a block diagram 1200 of field vectors, according to one embodiment of the present disclosure.

FIG. 9 is a block diagram 900 of a word embedding implementation (e.g., Word2Vec script 905), according to one embodiment. FIG. 10 is a block diagram 1000 of word vectors, according to another embodiment. FIG. 11 is a block diagram 1100 of a field vector implementation (e.g., Field2Vec script 1105), according to some embodiments. FIG. 12 is a block diagram 1200 of field vectors, according to other embodiments. FIG. 13 is a block diagram 1300 of a log vector implementation, according to certain embodiments.

Example Processes for Log Anomaly Detection (Log2Vec)

Figure 14:
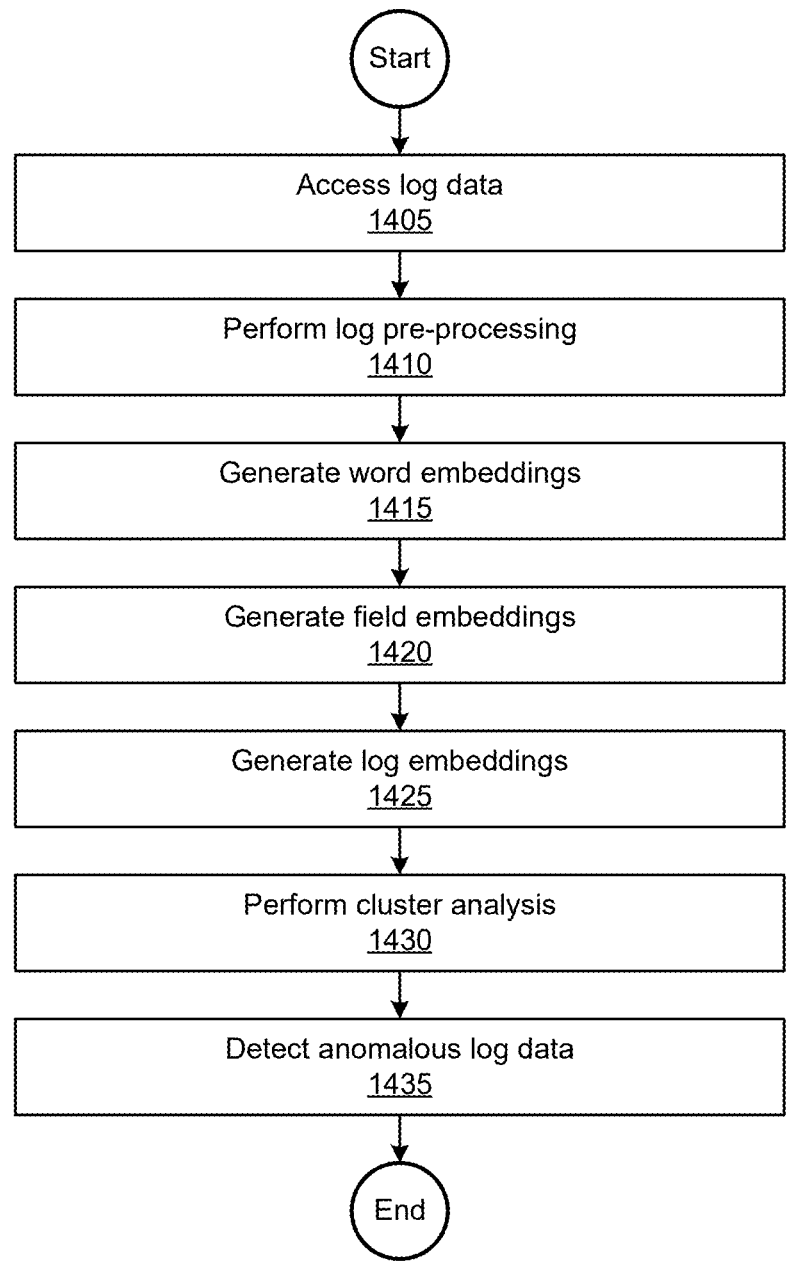
FIG. 14 is a flowchart 1400 of a process for detecting anomalous log data, according to one embodiment of the present disclosure.

FIG. 14 is a flowchart 1400 of a process for detecting anomalous log data, according to one embodiment. The process begins at 1405 by accessing log data, and at 1410, performs log pre-processing. At 1415, the process generates word embeddings. At 1420, the process generates field embeddings. At 1425, the process generates log embeddings. At 1430, the process performs cluster analysis and ends at 1435 by detecting anomalous log data. In some embodiments, the process of FIG. 14 can be performed by pre-processing engine 120 based on log data received from (and by) log manager 115.

Figure 15:
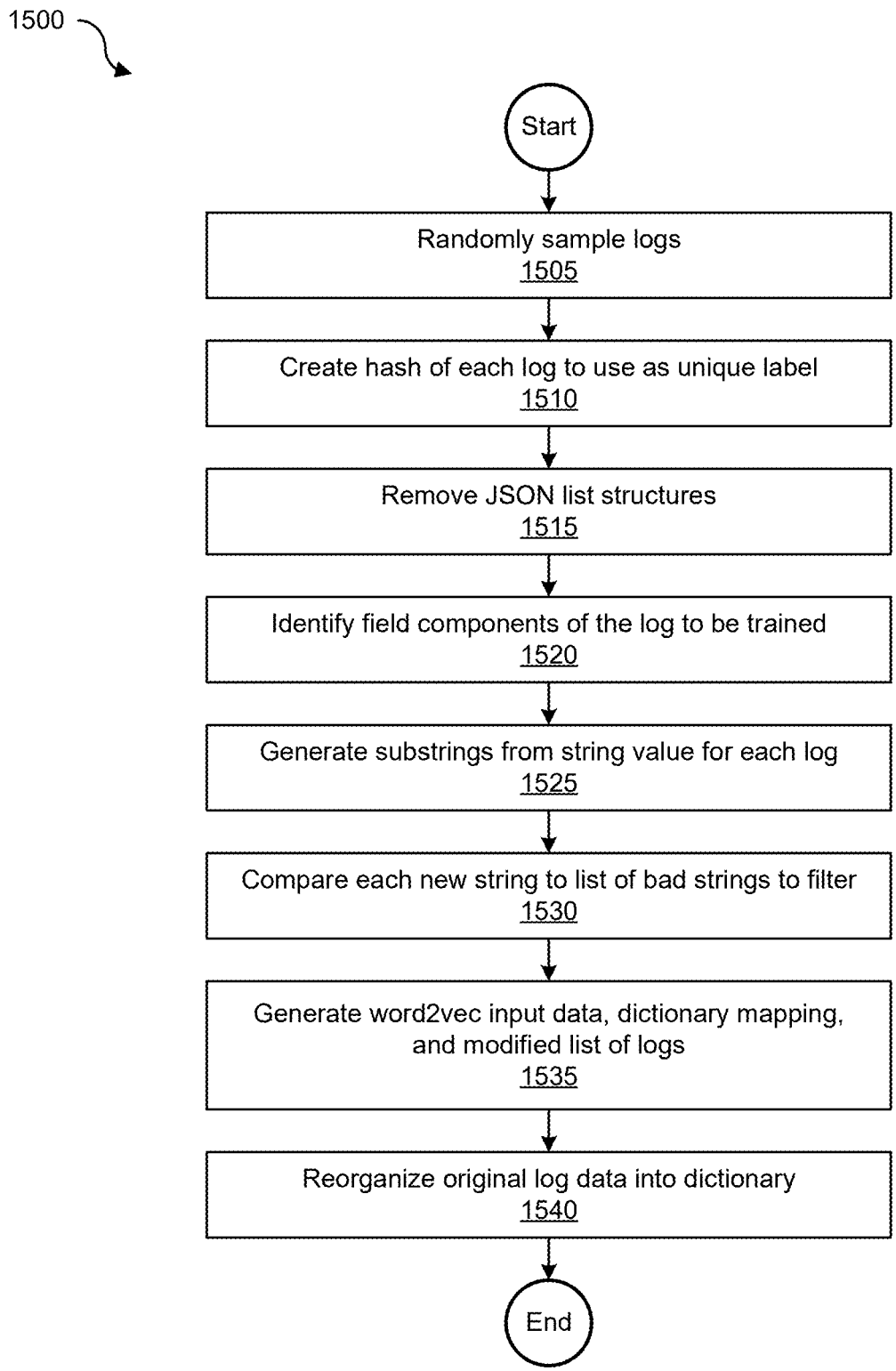
FIG. 15 is a flowchart 1500 of a process for reorganizing original log data, according to one embodiment of the present disclosure.

FIG. 15 is a flowchart 1500 of a process for reorganizing original log data, according to one embodiment. The process begins at 1505 by randomly sampling logs and at 1510, creates a hash of each log to use as a unique label. At 1515, the process removes JSON list structures and at 1520 identifies field components of the log to be trained. At 1525, the process generates substrings from the string value for each log, and at 1530, compares each new string to a list of bad strings to filter. At 1535, the process generates word embedding input data, dictionary mapping, and a modified list of logs, and ends at 1540 by reorganizing the original log data into a dictionary (e.g., a frame in which some training data admits a sparse representation). In some embodiments, the process of FIG. 15 can be performed by pre-processing engine 120 in combination with word embedding engine 125.

Figure 16:
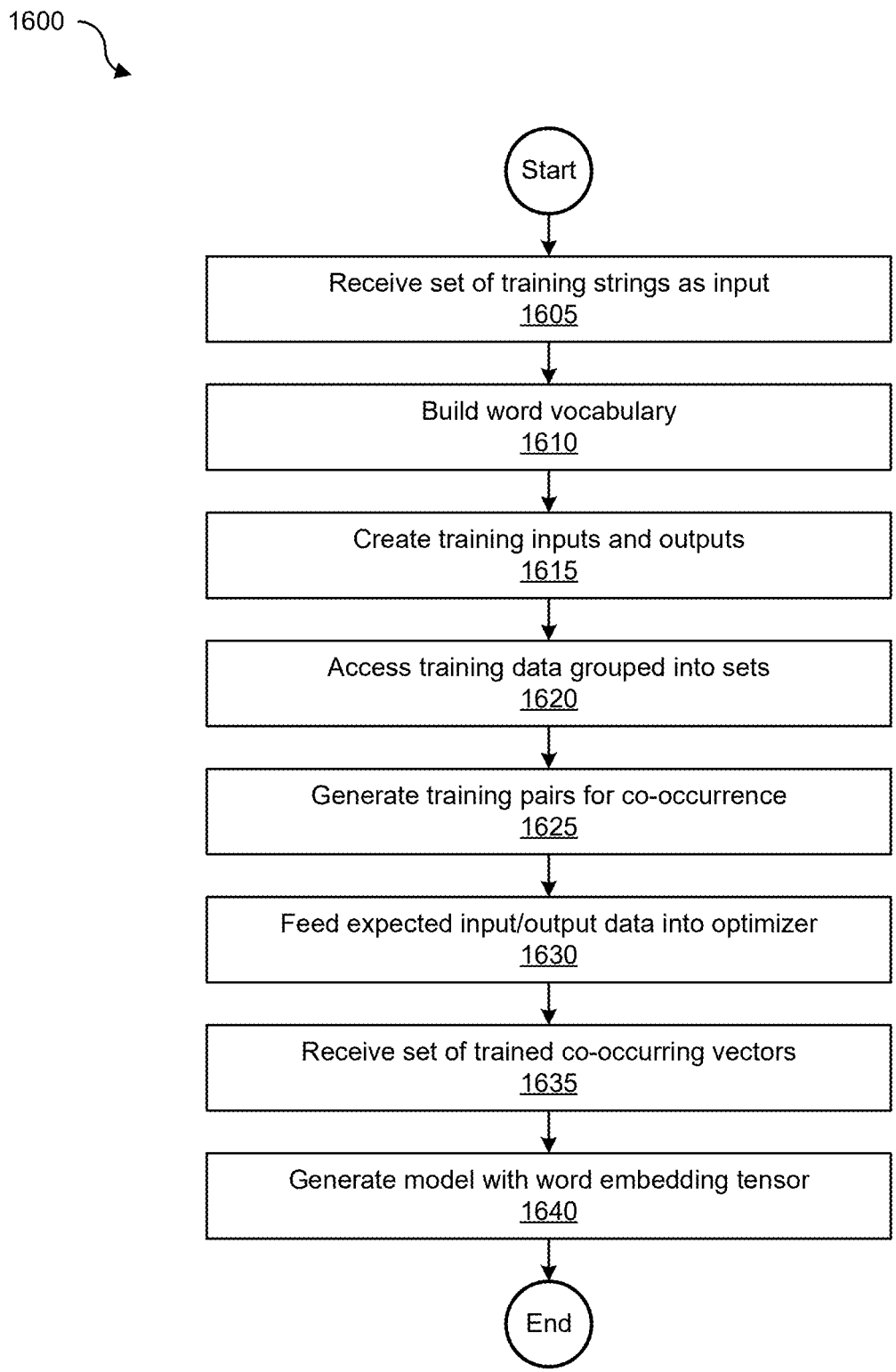
FIG. 16 is a flowchart 1600 of a process for generating a model with a word embedding tensor, according to one embodiment of the present disclosure.

FIG. 16 is a flowchart 1600 of a process for generating a model with a word embedding tensor, according to one embodiment. The process begins at 1605 by receiving a set of training strings as input, and at 1610, builds a word vocabulary. At 1615, the process creates training inputs and outputs, and at 1620, accesses training data grouped into sets. At 1625, the process generates training pairs for co-occurrence, and at 1630, feeds expected input/output data into an optimizer. At 1635, the process receives a set of trained co-occurrence vectors and ends at 1640 by generating a model (e.g., a machine learning model) with a word embedding tensor.

Figure 17:
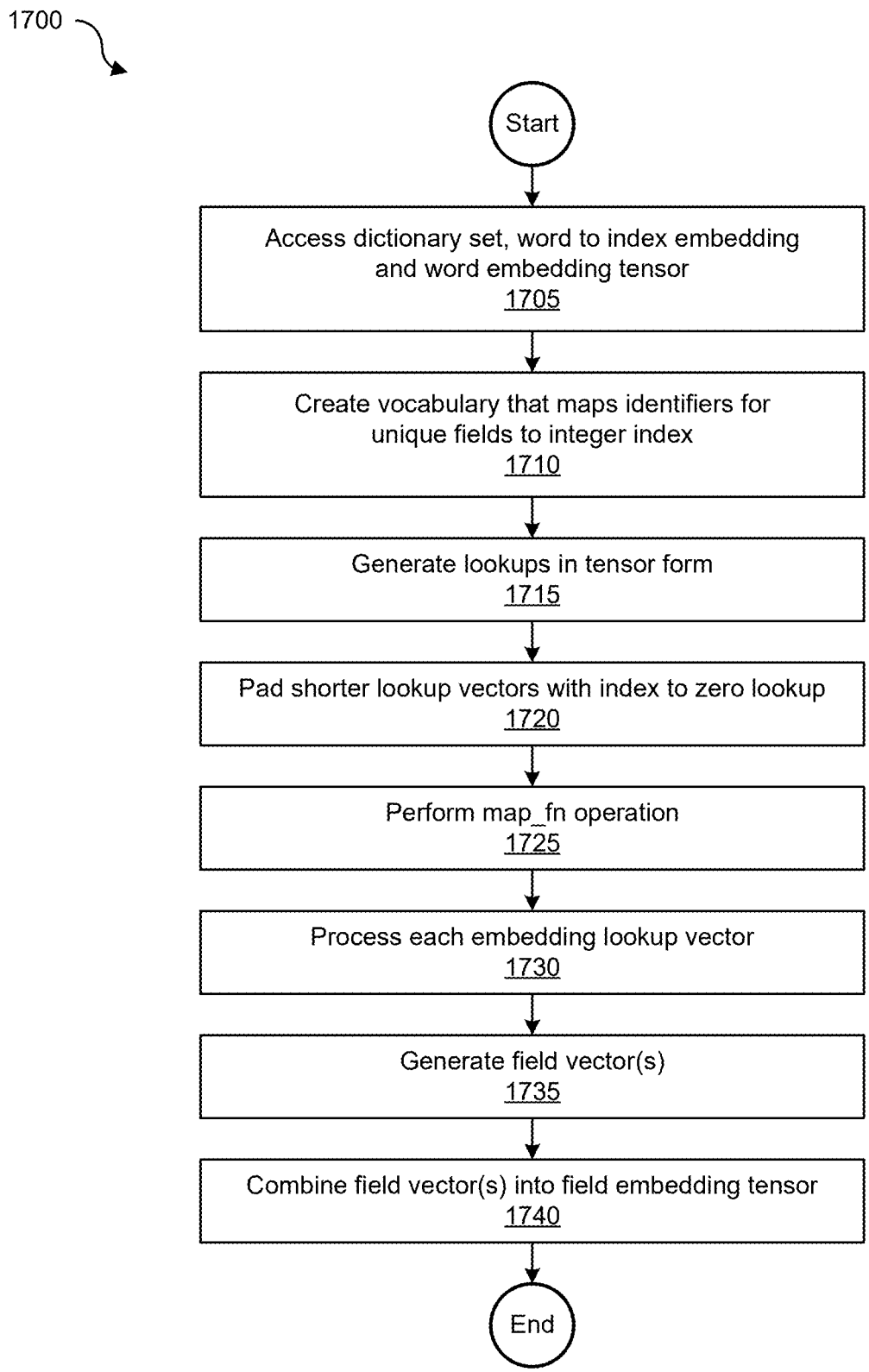
FIG. 17 is a flowchart 1700 of a process for combining field vectors into a field embedding tensor, according to one embodiment of the present disclosure.

FIG. 17 is a flowchart 1700 of a process for combining field vectors into a field embedding tensor, according to one embodiment. The process begins at 1705 by accessing a dictionary set, a word to index embedding, and (the) word embedding tensor (e.g., from step 1640 in FIG. 16). At 1710, the process creates a vocabulary that maps identifiers for unique fields to an integer index, and at 1715, generates lookups in tensor form. At 1720, the process pads shorter lookup vectors with an index to zero lookup. At 1725, the process performs a map_fn operation (e.g., shown in dotted lines "for each field" in FIG. 11), and at 1730, processes each embedding lookup vector. At 1735, the process generates field vector(s), and ends at 1740 by combining field vectors into a field embedding tensor. In some embodiments, the process of FIG. 17 can be performed by field embedding engine 130.

Figure 18:
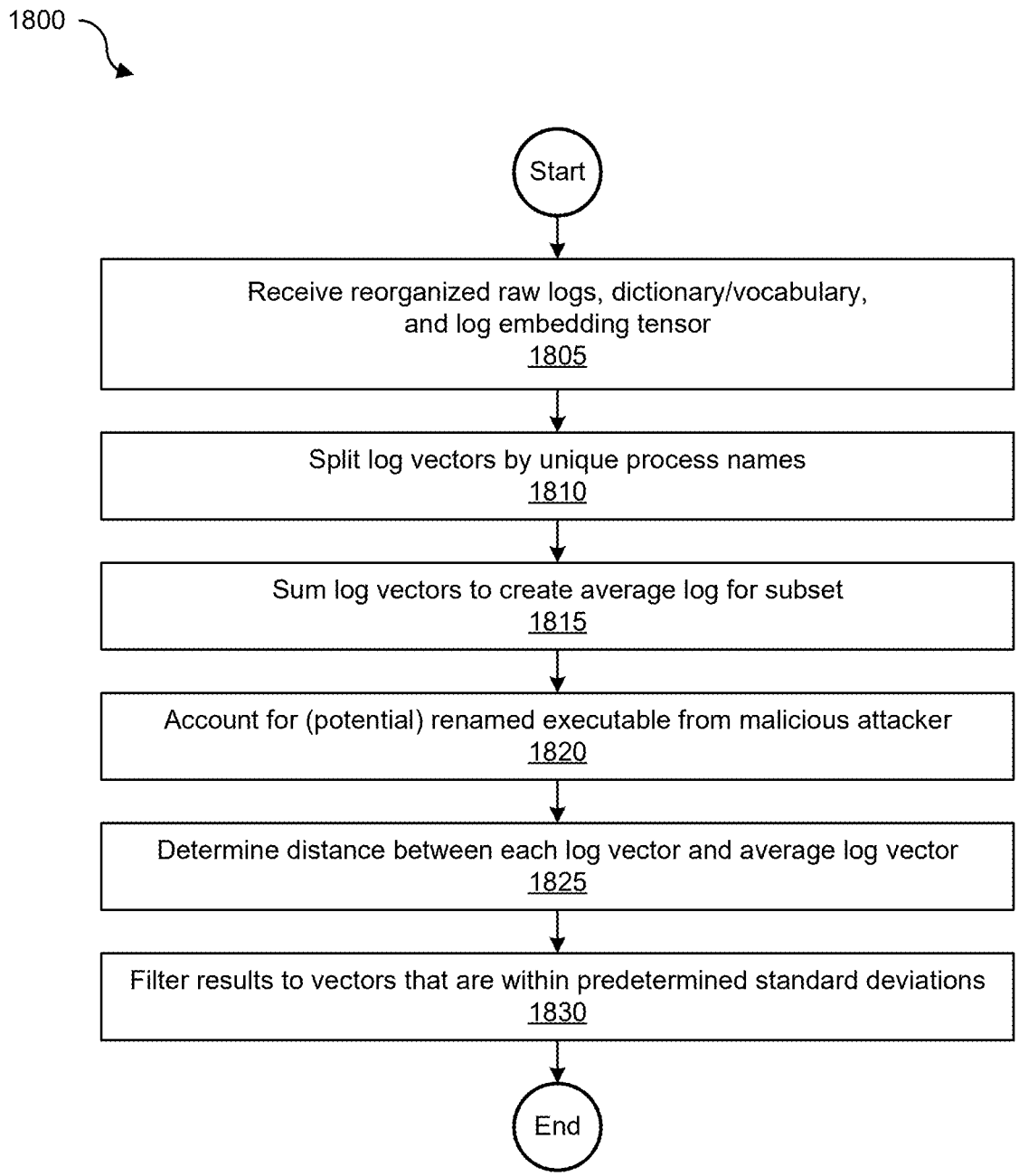
FIG. 18 is a flowchart 1800 of a process for identifying anomalies in log data, according to one embodiment of the present disclosure.

FIG. 18 is a flowchart 1800 of a process for identifying anomalies in log data, according to one embodiment. The process begins at 1805 by receiving reorganized raw logs, a dictionary/vocabulary, and a log embedding tensor, and at 1810, splits the log vectors by unique process names. At 1815, the process sums log vectors to create an average log for the subset, and at 1820, accounts for (potential) renamed executable(s) from malicious attacker(s). At 1825, the process determines the distance between each log vector and the average log vector, and ends at 1830 by filtering results to vectors that are within predetermined standard deviations. In some embodiments, the process of FIG. 18 can be performed by log embedding engine 135.

In addition to detecting anomalies in logs (e.g., using log anomaly detection engine 110), MDR server 105 also implements UHP timeliner engine 170 (e.g., to visualize anomalies in log data based on a timeline) and Markovian analysis engine 175 (e.g., to analyze anomalies in log data), as shown in FIG. 1B.

Example of Visualizing Anomalies in Logs (UHP-Timeline Visualization)

One method of distinguishing regular activity from that of a malicious attacker is to determine whether such activity is occurring outside of a company's regular 9 am to 5 pm Monday through Friday working schedule. However, for a SOC analyst, there exists no methodology to easily navigate and identify irregular activity outside of regular working hours. Existing methodologies involve filtering log data to particular hours. However, this approach does not give the SOC analyst a sense of what regular activity in the environment looks like-which limits their ability to identify genuine irregularities that can be indicative of malicious behavior.

Figure 19A:
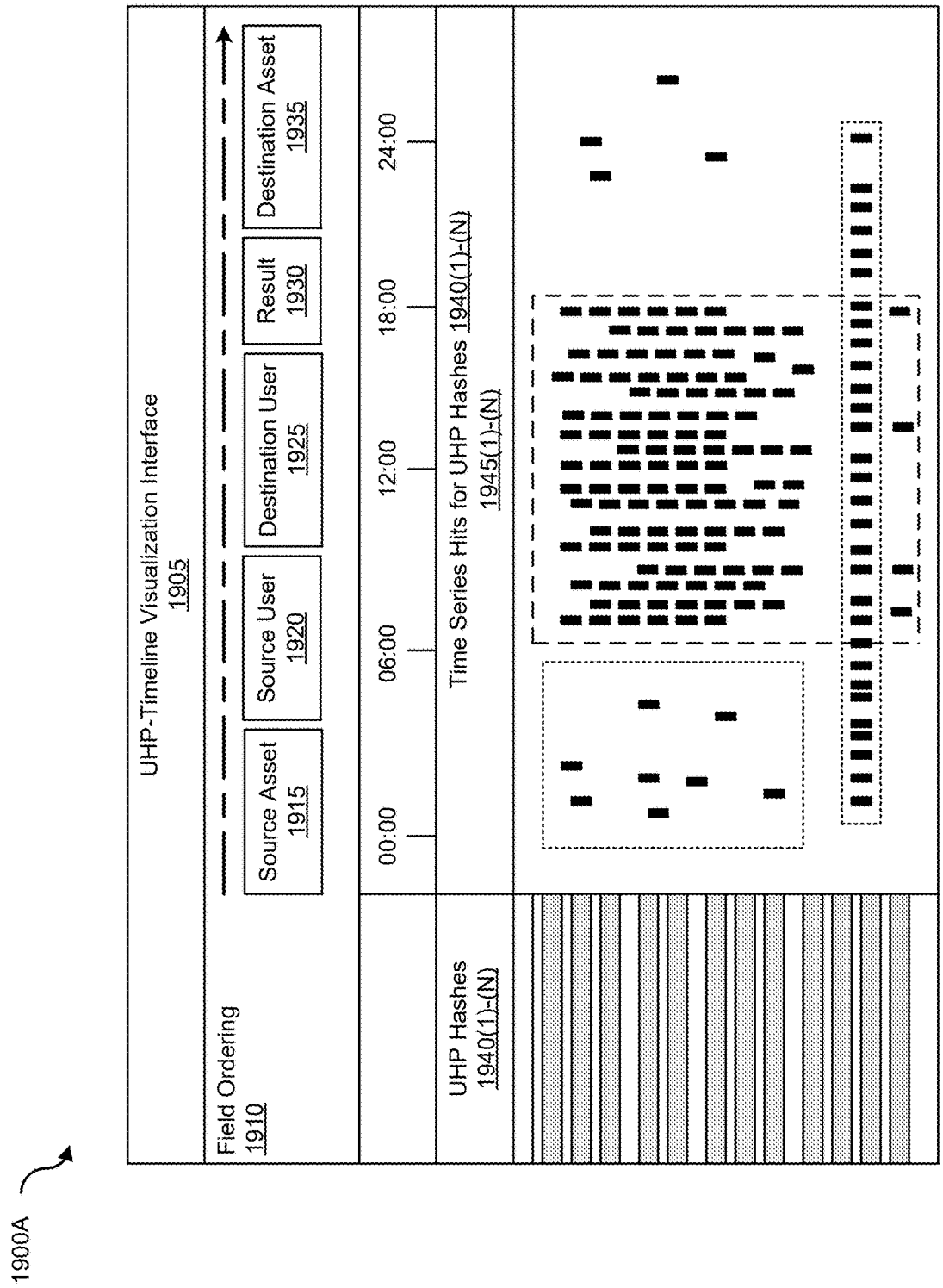
FIG. 19A is a block diagram 1900A of a user interface of a UHP-Timeline Visualizer, according to one embodiment of the present disclosure.

FIG. 19A is a block diagram 1900A of a user interface of a UHP-Timeline Visualizer, according to one embodiment. In this example, a UHP-timeline visualization interface 1905 is part of a UI application that permits SOC analysts to classify logs according to a hash of values of a collection of fields, and display timeseries data for all such hashes across a given computing environment in a manner that optimizes the ability to visualize and search activity going on (or taking place) after hours.

For each process in a log, UHP timeliner engine 170 takes the User, Hostname, Process Path, Process MD5, and Process CommandLine and hashes the combination of the foregoing values to generate a hash that represents a particular activity in a given computing environment. Unique activities can often occur multiple times in a computing environment over the course of a day, and the timeseries data can be extracted. UHP timeliner engine 170 takes the timeseries data for hashes and displays them on top of each other on a particular timescale.

In certain embodiments, UHP-timeline visualization interface 1905 provides the ability to drag and select log instances of activity, the ability to filter and query the hashes to limit the quantities of data, and the ability to tag and whitelist particular hashes/activity as expected. UHP-timeline visualization interface 1905 works with any JSON or key/value pair log type and the selection of fields that get hashes can be customized. In addition to the selection of a time period to display data from, UHP-timeline visualization interface 1905 permits activity of several days to be overlaid on each other on a 24-hour review, or alternatively, permits activity over several weeks to be overlaid on a 7-day Monday through Sunday timeline.

Currently, there exists no mechanism that permits a SOC analyst to visualize and interact with a timeseries graph of log activity in a given computing and/or networking environment. In addition, UHP-timeline visualization interface 1905 is enabled to analyze time series data for hashes. In existing implementations, when considering UHP hashes, the only timestamps stored per hash are "first_seen" and "last_seen" timestamps. This means that the same UHP activity could occur at a very unusual time and would be missed. For example, if a system administrator starts a remote desktop executable from an asset—that could be part of their work activities during the day—but would be unusual if the activity occurred at 2 am on a Sunday.

UHP-timeline visualization interface 1905 includes at least a field ordering 1910 with a source asset 1915, a source user 1920, a destination user 1925, a result 1930, and a destination asset 1935. UHP-timeline visualization interface 1905 also includes UHP hashes 1940(1)-(N) and time series hits for UHP hashes 1940(1)-(N) 1945(1)-(N). As shown in FIG. 19A, and in certain embodiments, the black rectangular blocks within the wide dotted lines ( - - - ) (in the center between 6:00 AM and 6:00 PM) can signal normal activity where as the black rectangular blocks within the small dotted lines (on the left and on the bottom ( . . . )) (e.g., between midnight and 6:00 AM and for a whole 24-hour period) can indicate anomalous activity and can provide visualization of such anomalous activity (e.g., to a SOC analyst).

In one embodiment, a user configures a set of logs to be viewed in UHP-timeline visualization interface 1905 and which key/value pairs of that log set to generate hashes for. The user can also select a limited window for storage of the hashes and their equivalent timeseries data and the granularity (e.g., hour, minute, second, millisecond) of the timeseries data. Upon configuring UHP-timeline visualization interface 1905, the log data in storage is accessed by UHP timeliner engine 170 to identify and retrieve each unique hash, along with the hash's key/value pairs and stores them in a database for later retrieval. Timeseries data is added to the database as the log data is being processed. Once the database is complete, the hashes are used in the realtime logging pipeline to track new instances of each hash and add to the timeseries data in the database. In addition, the database is permitted to age out (e.g., timeseries data that goes beyond the limit of configured and agreed retention). In this manner, live and realtime timeseries data is constantly maintained (and refreshed) in the database (e.g., database 2510) for visualization (and other) purposes in UHP-timeline visualization interface 1905.

In certain embodiments, APIs are provided for downloading pre-baked visualization data to browser clients (e.g., not the timeseries data itself) to minimize what would otherwise involve a large transfer of data.

In some embodiments, the UI-web application that is generated by UHP timeliner engine 170 and provides UHP-timeline visualization interface 1905 is configured as follows: the UI features a component that is akin to a combination of a spreadsheet and a music/audio editor. There is a portion of the UI dedicated to a list of all unique UHP hashes and another portion of the UI dedicated to a timeline of activity in the form of a series of dashes for each hash (e.g., the black rectangular blocks illustrated in FIG. 19A, and discussed above). In addition, the UI includes UI components for ordering, sorting, and filtering the hashes by each of the fields that are hashed. Also included can be components to select a time range for data a SOC analyst wishes to view, including the option to overlay that time range onto a 24-hour period, Monday-Sunday period, or even a calendar-like monthly period. In some examples, the visualizer (e.g., the UI, UI application, or UHP-timeline visualization interface 1905) includes zoom mechanisms to permit a SOC analyst to dig into specific behaviors. Timeline items can be selected on click or by dragging a selection box over a few items. In certain embodiments, with a selection of log instances, the UI application can either link to a log search page or provide a pop up log display window where a SOC analyst can view the selected items in depth.

In one embodiment, a user can configure alerting for activity based on a specific field (e.g., activity for a particular user or process if it occurs during a particular time span in a 24 hour period or if it occurs during the weekend). Such alerts can be whitelisted for specific hashes (e.g., backup processes, production server processes, and the like).

Figure 19B:
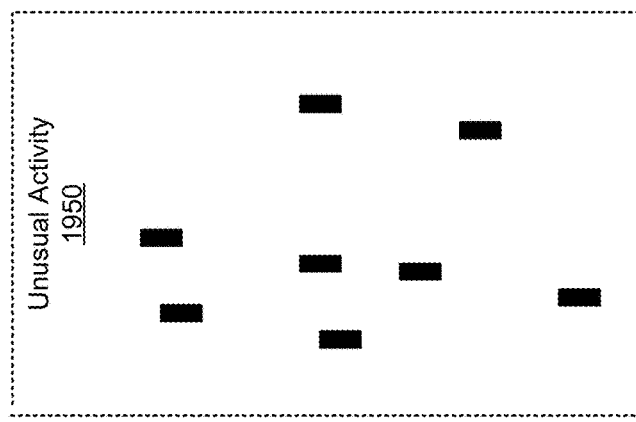
FIG. 19B is a block diagram 1900B of a UI-based visualization of anomalous log data, according to one embodiment of the present disclosure.

FIG. 19B is a block diagram 1900B of a UI-based visualization of anomalous log data, according to one embodiment. As shown in FIG. 19B, unusual activity 1950 (e.g., potentially anomalous activity) includes one or more (visual) dashes for each hash (e.g., as shown in the left side of the user interface in FIG. 19A). Selected items 1955(1)-(N) can visually identify each log, timeseries data associated with the hash of said log, and the (potentially malicious or anomalous) process associated with the given log (e.g., Log 1, bad.exe, and 2019 Jul. 5 00:10, and the like, as shown in FIG. 19B).

Figure 20:
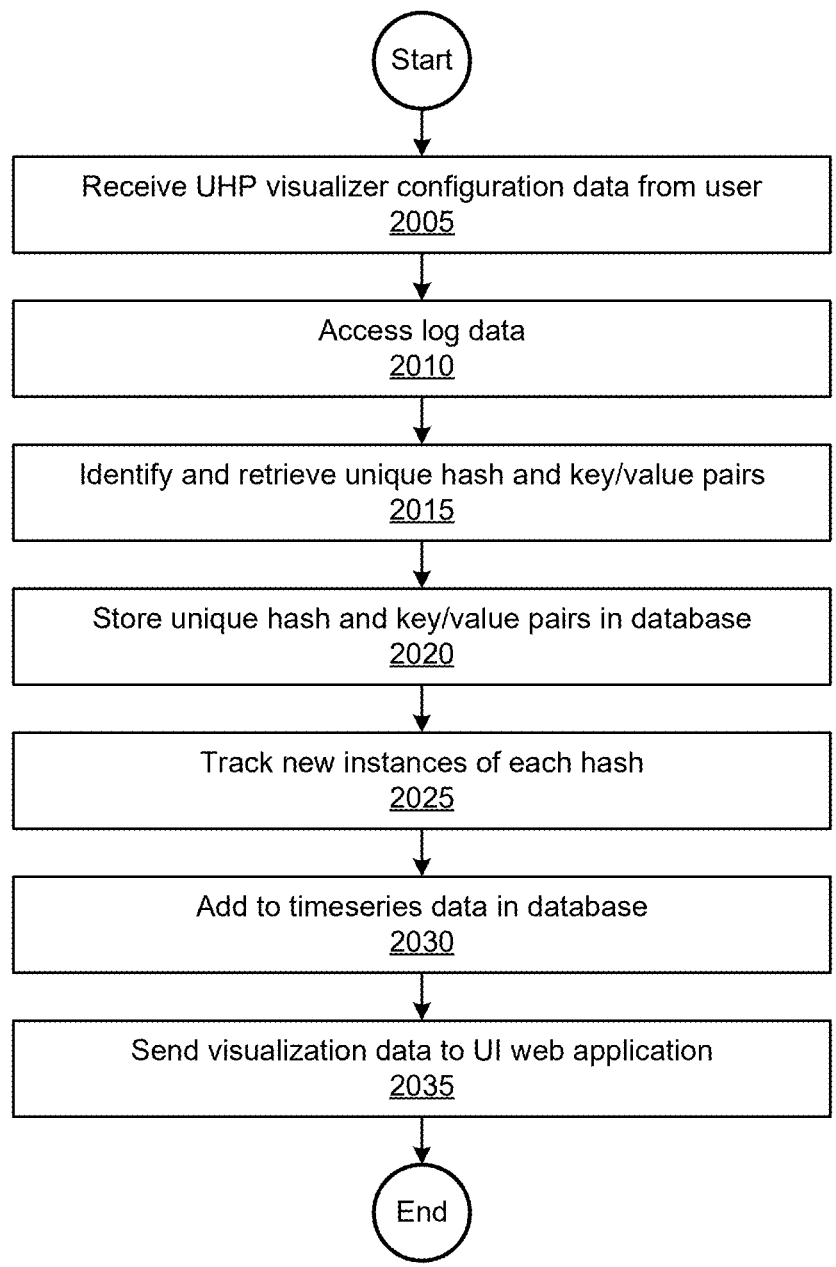
FIG. 20 is a block diagram 2000 of a process for preparing and sending visualization data to a UI-based web application, according to one embodiment of the present disclosure.

FIG. 20 is a block diagram 2000 of a process for preparing and sending visualization data to a UI-based web application, according to one embodiment. The process begins at 2005 by receiving UHP visualizer configuration data from user, and at 2010, accesses log data. At 2015, the process identifies and retrieves unique hash and key/value pairs, and at 2020, stores the unique hash and key/value pairs in a database. At 2025, the process tracks new instances of each hash, and at 2030, adds to the timeseries data in the database. The process ends at 2035 by sending visualization data to a UI web application (e.g., UHP-timeline visualization interface 1905).

Example of Applying Markovian Analysis to Threat Hunting

Malware tends to really like (and favor) randomized strings (e.g., a series of number and letters that have no pattern—for instance, a 16-character unique output). If a piece of malware is not randomizing the information about itself (e.g., the malware) that appears in log, defenders (e.g., SOC analysts) can quickly learn to create rules that can match against an entire family (of malware). Static strings can become (not great) indicators of compromise (IOCs) and SOC analysts can also use static strings to link families of malware together. To avoid the foregoing, malware tends to (fully or partially) randomize everything about itself.

For real time detection, string IOCs are rather weak and instead, rules are set on specific process behaviors that have been used in previous malicious attacks. However, in threat hunting, SOC analysts typically manipulate and search through data to detect anomalies that may be indicative of attacker behavior (e.g., in case either the detections have somehow failed or the malware is utilizing a new behavior altogether).

One method to detect malware during hunting involves gathering a large set of log data and "stacking" on fields (e.g., counting the unique values for a particular field). For a SOC analyst, a positive (or good) sign of malware when analyzing stack data involves finding a path that includes unusual or randomized strings (e.g., C:\ProgramData\ewposnfpwe\cxnvxio.exe—which can be a dead giveaway). However, detecting these unusual or randomized strings in a sea of legitimate paths can be extremely challenging to perform (e.g., manually). Even worse, there are certain pieces of legitimate software that can use some form of randomized strings (e.g., C:\users\user61\appdata\local\apps\2.0\0cyyyw94.wt9\lcw 31498.at7\dell..tion_831211ca63b981c5_0008.000b_1656 22fff4cd0fc1\dellsystemdetect.exe).

Such legitimate paths often use some sort of consistent pattern (e.g., a combination of version numbers, hashes, and universally unique identifiers (UUIDs)). One can manually suggest "normalizations" for large sets of paths. For example, normalizations can be manually created for the following paths (e.g., as shown in FIG. 21):

C:\users\user1232\appdata\local\microsoft\onedrive\onedrive.exe
C:\users\admin-dave\appdata\local\microsoftonedrive\onedrive.exe
C:\users\user12\appdata\local\microsoftonedrive\onedrive.exe
C:\users\user821\appdata\local\microsoftonedrive\onedrive.exe
C:\users\software_svc\appdata\local\microsoft\onedrive\onedrive.exe By creating regex (regular expression(s)) to detect and replace the users with %USERNAME%, the number of unique lines can be condensed down to: C:\users\%USERNAME%\appdata\local\microsoft\onedrive\onedrive.exe.

Therefore, with respect to malware and threat hunting (in the context of random strings), there are at least two existing technology-related problems that require technology-related solutions: (1) a system/method/approach that can automatically identify paths with unusual or randomized strings and present them to a SOC analyst above other(s) (other strings) and (2) a system/method/approach that can automatically suggest regex normalizations for large amounts of repetitive data.

Markovian analysis engine 175 configures, implements, and performs Markovian analysis with respect to threat hunting in at least three stages. In the first stage, a variation of Markovian string analysis using a combination of techniques (one or more than are unknown in the art) is performed. For example, a variety of Markov prediction models are used including variations of Ngram and skip-grams. However, in one embodiment, these various Markov prediction models are applied at both an individual character level (e.g., because of paths and command line arguments) and at a folder/file name level. In addition, a variety of Regex character replacements are performed for pre-processing to develop Markov models for picking up common patterns of special characters (e.g., globally unique identifiers (GUIDs)).

In some embodiments, the foregoing wide variety of Markov models can be applied to either individual key/values in a log to generate the probabilistic likelihood of particular values (e.g., file paths, and the like). In the alternative, such analysis can be performed on various key/values in a log to retrieve a probabilistic likelihood of a particular log.

In the second stage, and in other embodiments, a UI component for applying a heatmap based on probability to characters in a string is configured and implemented. For example, characters that have a high likelihood versus a low likelihood can be colored differently. When reviewing paths and logs with low probabilistic likelihoods, it may not always be apparent to a SOC analyst why that (given) path is unlikely. Therefore, highlighting characters that are unlikely permits the SOC analyst to readily identify what is irregular. In the third stage, and in some embodiments, Markovian analysis engine 175 implements a system that suggests normalization or Regex replacements for particular sets of paths (e.g., at least because GUIDs and other common patterns can create significant noise into lists of unique values).

In one embodiment, Markovian analysis engine 175 can find randomized or unusual executable names or paths in a hunt and the UI probability heatmap can permit a SOC analyst to readily identify character(s) in the path that are unlikely or unusual. FIG. 21 is a block diagram 2100 of a Markovian analysis engine, according to one embodiment. FIG. 21 illustrates the aforementioned heatmap that visually identifies characters in a given path that are unusual or unlikely (e.g., ewposnfpwe\cxnvxio, 61 user (and 0cyyyw94.wt9\lcw31498.at7, 831211ca63b981c5, 0008.000b_165622fff4cd0fc1), 1232, admin-dave, 12, 821, and software (shown bolded, underlined, or with a bigger font in FIG. 21)). Further, the normalization suggestion provided by Markovian analysis engine 175 can benefit other areas of threat hunting by normalizing and therefore reducing the number of unique values.

A significant portion of Markovian analysis revolves around ngrams and skip grams. In one embodiment, Markovian analysis engine 175 performs Markov(ian) analysis (e.g., statically modeling random processes, where the probabilistic distribution is obtained solely by observing transitions from current state to next state) on paths. The following approaches are contemplated in certain embodiments with respect to applying Markovian analysis to threat hunting (e.g., Markovian analysis on paths):

In one embodiment, character/ngram chains (e.g., up to some maximum character length N) are implemented: A series of adjacent characters-ngrams (e.g., for string "Windows", starting at character "w": n=1 is "wi", n=2 is "win", n=3 is "wind" etc. In another embodiment, a series of skip-grams are implemented (e.g., for string "Windows", starting at character "w": n=1 is "w_n", n=2 is "w_d", n=3 is "w_o", etc.

In some embodiments, file/folder based chains (e.g., up to some maximum folder depth I) are implemented: A series of adjacent folder/file substrings—ipaths (e.g., for "c:\windows\system32\windowspowershell\v1.0\power shell.exe" starting at substr "C:": n=1 is "c:\windows", n=2 is "c:\windows\system32", n=3 is "c:\windows\system32\windowspowershell" etc. In other embodiments, a series of skip paths is/are implemented (e.g., for "c:\windows\system32\windowspowershell\v1.0\power shell.exe" starting at substr "C:": where, in one or more embodiments, n=1 is "c:\windows", n=2 is "c:\_\windows\system32", n=3 is "c:\_\windows\system32\windowspowershell" etc.

In certain embodiments, negative ngram based chains are implemented (e.g., for "c:\windows\system32\windowspowershell\v1.0\power shell.exe", starting at character "p": n=–0 is "p_e", n=–1 is "p_x", n=–2 is "p_e", n=–3 is "p_" etc. In addition, variations of negative ngram based chains for skip grams and for full paths are also contemplated.

In one embodiment, special consideration is provided for suggesting Regex, where a file/folder convention may have different characters that can be replaced by a regex suggestion. In this example, the characters pivoted on can only be not in the set [a-zA-z0-9] and there is an assumption that if there is a special naming convention for files/folders, the convention will not include differing numbers of special characters (e.g., no folder cases such as "\foldername{b", "\foldername{{b","\foldername{{{b". In "C:\ProgramData{1B8BDEE8-91C9-542E-170F-CA6C8D4DD41A2}\nema.txt": A-replace: replacing any [a-zA-Z0-0] length I with A[i], the path is "A:\AAAAAAAAAA{AAAAAAAA-AAAA-AAAA-AAAA-AAAAAAAAAAAA}AAAA.AAA", N-shrink: replacing any segment of [a-zA-Z0-0] with the count of characters in set [a-zA-Z0-0], the path is "1:\11{8-4-4-4-12}\4.3" (it should be noted that "11" and "12" are treated as single "characters" for ngrams), A-single: replacing any [a-zA-Z0-9] on n length with 'A', the path is "A:\A{A-A-A-A-A}A.A".

In one embodiment, Markovian analysis engine 175 uses at least the three methods described above and uses them to pre-process the training data and then performs the ngram/skip gram/negative n gram chains on the processed paths. The foregoing approach can also be used for various regex groups (e.g., [a-z], [A-Z], [0-9], [0-9A-F] (Hex), and the like. In this manner, processing can be parallelized.

Figure 23:
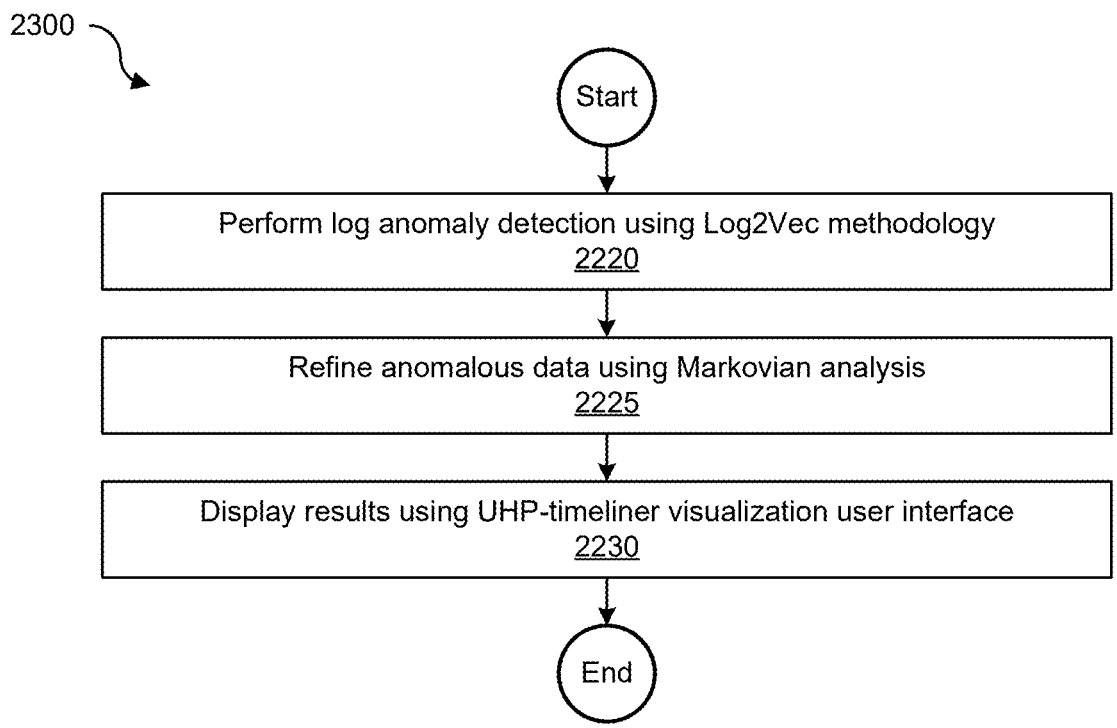
FIG. 23 is a flowchart 2300 of a process to perform log anomaly detection, according to one embodiment of the present disclosure.
Figure 24:
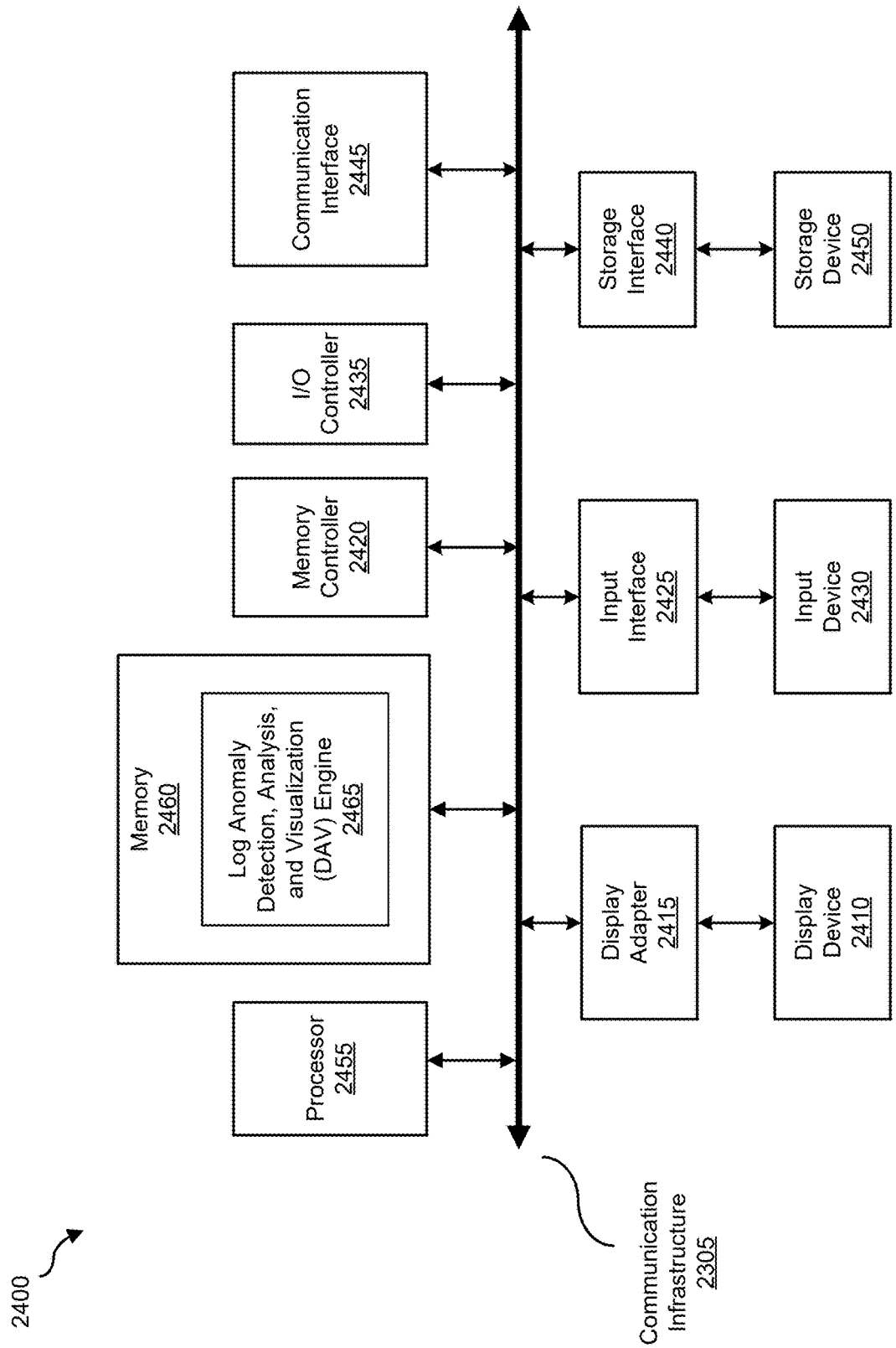
FIG. 24 is a block diagram 800 of a computing system, illustrating a log anomaly detection, analysis, and visualization (DAV) engine implemented in software, according to one embodiment of the present disclosure.

FIG. 22 is a flowchart 2200 of a process for identifying anomalous log data using Markovian prediction models, according to one embodiment. The process begins at 2205 by performing Markovian string analysis by applying multiple Markov prediction models to one or more key/values (KV-pairs) in a log. At 2210, the process applies a heatmap based on the probability to characters in string using the a UI component. The process ends at 2215 by identifying normalization or regex replacements for particular sets of paths.
Example Process to Perform Log Anomaly Detection, Visualization, and Analysis FIG. 23 is a flowchart 2300 of a process to perform log anomaly detection, according to one embodiment. The process begins at 2220 by performing log anomaly detection using (one or more embodiments) of the Log2Vec methodology described herein (e.g., provided by log anomaly detection engine 110 as shown in FIGS. 1A and 1B). At 2225, the process refines anomalous data using Markovian analysis (e.g., performed by Markovian analysis engine 175 as shown in FIG. 1B and FIG. 21). The process ends at 2230 by displaying results using a UHP-timeliner visualization user interface (e.g., UHP-timeline visualization interface 1905 as shown in FIG. 19A provided by UHP timeliner engine 170 as shown in FIG. 1B).
Example Computing Environment FIG. 24 is a block diagram 2400 of a computing system, illustrating how a log anomaly detection, analysis, and visualization (DAV) engine 2465 can be implemented in software, according to one embodiment. Computing system 2400 can include MDR server 105 and broadly represents any single or multi-processor computing device or system capable of executing computer-readable instructions. Examples of computing system 2400 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 2400 may include at least one processor 2455 and a memory 2460. By executing the software that executes log anomaly DAV engine 2465 (which includes log anomaly detection engine 110, UHP timeliner engine 170, Markovian analysis engine 175, and security operations engine 180 of FIG. 1B), computing system 800 becomes a special purpose computing device that is configured to perform log anomaly detection, analysis, and visualization (e.g., for threat hunting, among other purposes/uses).

Processor 2455 generally represents any type or form of processing unit capable of processing data or interpreting and executing instructions. In certain embodiments, processor 2455 may receive instructions from a software application or module that may cause processor 2455 to perform the functions of one or more of the embodiments described and/or illustrated herein. For example, processor 2455 may perform and/or be a means for performing all or some of the operations described herein. Processor 2455 may also perform and/or be a means for performing any other operations, methods, or processes described and/or illustrated herein. Memory 2460 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 2400 may include both a volatile memory unit and a non-volatile storage device. In one example, program instructions implementing log anomaly DAV engine 2465 (which includes log anomaly detection engine 110, UHP timeliner engine 170, Markovian analysis engine 175, and security operations engine 180) may be loaded into memory 2460 (or memory 165 of FIG. 1B).

In certain embodiments, computing system 2400 may also include one or more components or elements in addition to processor 2455 and/or memory 2460. For example, as illustrated in FIG. 24, computing system 2400 may include a memory controller 2420, an Input/Output (I/O) controller 2435, and a communication interface 2445, each of which may be interconnected via a communication infrastructure 2405. Communication infrastructure 2405 generally represents any type or form of infrastructure capable of facilitating communication between one or more components of a computing device.

Memory controller 2420 generally represents any type/form of device capable of handling memory or data or controlling communication between one or more components of computing system 2400. In certain embodiments memory controller 820 may control communication between processor 2455, memory 2460, and I/O controller 2435 via communication infrastructure 2405. I/O controller 2435 generally represents any type or form of module capable of coordinating and/or controlling the input and output functions of a computing device. For example, in certain embodiments I/O controller 2435 may control or facilitate transfer of data between one or more elements of computing system 2400, such as processor 2455, memory 2460, communication interface 2445, display adapter 2415, input interface 2425, and storage interface 2440.

Communication interface 2445 broadly represents any type/form of communication device/adapter capable of facilitating communication between computing system 2400 and other devices and may facilitate communication between computing system 2400 and a private or public network. Examples of communication interface 2445 include, a wired network interface (e.g., network interface card), a wireless network interface (e.g., a wireless network interface card), a modem, and any other suitable interface. Communication interface 2445 may provide a direct connection to a remote server via a direct link to a network, such as the Internet, and may also indirectly provide such a connection through, for example, a local area network. Communication interface 2445 may also represent a host adapter configured to facilitate communication between computing system 2400 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 2400 may also include at least one display device 2410 coupled to communication infrastructure 2405 via a display adapter 2415 that generally represents any type or form of device capable of visually displaying information forwarded by display adapter 2415. Display adapter 2415 generally represents any type or form of device configured to forward graphics, text, and other data from communication infrastructure 2405 (or from a frame buffer, as known in the art) for display on display device 2410. Computing system 2400 may also include at least one input device 2430 coupled to communication infrastructure 2405 via an input interface 2425. Input device 2430 generally represents any type or form of input device capable of providing input, either computer or human generated, to computing system 2400. Examples of input device 2430 include a keyboard, a pointing device, a speech recognition device, or any other input device.

Computing system 2400 may also include storage device 2450 coupled to communication infrastructure 2405 via a storage interface 2440. Storage device 2450 generally represents any type or form of storage devices or mediums capable of storing data and/or other computer-readable instructions. For example, storage device 2450 may include a magnetic disk drive (e.g., a so-called hard drive), a floppy disk drive, a magnetic tape drive, an optical disk drive, a flash drive, or the like. Storage interface 2440 generally represents any type or form of interface or device for transmitting data between storage device 2450, and other components of computing system 2400. Storage device 2450 may be configured to read from and/or write to a removable storage unit configured to store computer software, data, or other computer-readable information. Examples of suitable removable storage units include a floppy disk, a magnetic tape, an optical disk, a flash memory device, or the like. Storage device 2450 may also include other similar structures or devices for allowing computer software, data, or other computer-readable instructions to be loaded into computing system 2400. For example, storage device 2450 may be configured to read and write software, data, or other computer-readable information. Storage device 2450 may also be a part of computing system 2400 or may be separate devices accessed through other interface systems.

Many other devices or subsystems may be connected to computing system 2400. Conversely, all of the components and devices illustrated in FIG. 24 need not be present to practice the embodiments described and/or illustrated herein. The devices and subsystems referenced above may also be interconnected in different ways from that shown in FIG. 24. Computing system 2400 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 2400 for storage in memory via a network such as the Internet or upon a carrier medium.

The computer-readable medium containing the computer program may be loaded into computing system 2400. All or a portion of the computer program stored on the computer-readable medium may then be stored in memory 2460, and/or various portions of storage device 2450. When executed by processor 2455, a computer program loaded into computing system 2400 may cause processor 2455 to perform and/or be a means for performing the functions of one or more of the embodiments described/illustrated herein. Alternatively, one or more of the embodiments described and/or illustrated herein may be implemented in firmware and/or hardware, or via one or more machine learning model(s) (e.g., to perform log anomaly detection, visualization, and analysis for threating hunting, among other uses).

Example Networking Environment

FIG. 25 is a block diagram of a networked system, illustrating how various computing devices can communicate via a network, according to one embodiment. Network 155 generally represents any type or form of computer network or architecture capable of facilitating communication between MDR server 105 and clients 145(1)-(N). For example, network 155 can be a Wide Area Network (WAN) (e.g., the Internet), a Storage Area Network (SAN), or a Local Area Network (LAN).

Log anomaly DAV engine 2465 may be part of MDR server 105, or may be separate (e.g., part of log anomaly DAV system 2505). All or a portion of embodiments discussed and/or disclosed herein may be encoded as a computer program and loaded onto, stored, and/or executed by log anomaly DAV engine 2465, and distributed over network 155.

In some examples, all or a portion of log anomaly DAV system 2505 and/or MDR server 105 may represent portions of a cloud-computing or network-based environment. These cloud-based services (e.g., software as a service, platform as a service, infrastructure as a service, etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, log anomaly DAV engine 2465 may transform the behavior of MDR server 105 or log anomaly DAV system 2505 to perform log anomaly detection, visualization, and analysis for threat hunting by SOC analysts in a managed detection and response context (e.g., in cybersecurity computing environments).

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure.

What is claimed is:

1. A computer-implemented method, comprising:
accessing a log comprising a path with a plurality of strings;
pre-processing the log to generate an updated dataset, wherein the updated dataset includes a simplified path generated based on the path, wherein the simplified path is generated by performing an A-replace operation on the path, wherein the A-replace operation replaces each sequence of characters in a particular character set with a single-character sequence of a same length as the replaced sequence;
training a plurality of anomalous log data prediction models using the updated dataset by processing simplified paths in the updated dataset at a character level and at a name level, wherein the training includes building Markov prediction chains comprising transition probabilities between sequential elements of the simplified paths;
generating a character heatmap on a graphical user interface (GUI) for each simplified path processed by the plurality of anomalous log data prediction models based on the transition probability for each string of each path, wherein the transition probability indicates a probability of characters in each string of each path, and the character heatmap designates each character in each simplified path as high likelihood or low likelihood; and
displaying on the GUI one or more anomalies detected in the log, wherein the one or more anomalies are detected based on the plurality of anomalous log data prediction models and the character heatmap.

2. The computer-implemented method of claim 1, wherein
the A-replace operation comprises performing regular expression (regex) character replacement for one or more special characters in the plurality of strings by replacing (a) one or more alphanumeric characters, (b) one or more numbers, or (c) one or more upper case characters, one or more low case characters, and one or more numbers, and
performing the regex character replacement identifies one or more common patterns of special characters that comprise globally unique identifiers (GUIDs).

3. The computer-implemented method of claim 1, wherein the GUI identifies an anomaly in the log by displaying a sequence of characters in a path in a bolded, underlined, or bigger font, wherein the sequence of characters is determined to be unusual based on the anomalous log data prediction models.

4. The computer-implemented method of claim 1, further comprising:
receiving a new process event;
extracting a new path from the new process event;
processing the new path using the plurality of trained anomalous log data prediction models that are trained using the updated dataset;
generating an updated character heatmap that indicates a likelihood of each character in the new path predicted by each of the plurality of trained anomalous log data prediction models; and generating a regex replacement or normalization for (a) each of one or more new strings in the new path and (b) for one or more existing strings in the path or in other paths in the log that creates a new simplified path for one or more of the plurality of trained anomalous log data prediction models.

5. The computer-implemented method of claim 4, further comprising:
accessing the updated character heatmap;
comparing each of the new simplified paths for each of the plurality of trained anomalous log data prediction models based on the likelihood that each character in the new path is high likelihood or low likelihood; and
based on the comparing, identifying one or more new simplified paths of one or more trained anomalous log data prediction models as anomalous.

6. The computer-implemented method of claim 1, further comprising:
receiving historical log data;
batching the historical log data into a plurality of paths; and
filtering the plurality of paths based on a single type of string of one or more types of strings that are part of the plurality of paths.

7. The computer-implemented method of claim 6, wherein
the one or more types of strings comprise a file path and a child process, and
the plurality of strings comprise a plurality of key/value (KV) pairs.

8. A non-transitory computer readable storage medium comprising program instructions executable to:
access a log comprising a path with a plurality of strings;
pre-process the log to generate an updated dataset, wherein the updated dataset includes a simplified path generated based on the path, wherein the simplified path is generated by performing an A-replace operation on the path, wherein the A-replace operation replaces each sequence of characters in a particular character set with a single-character sequence of a same length as the replaced sequence;
train a plurality of anomalous log data prediction models using the updated dataset by processing simplified paths in the updated dataset at a character level and at a name level to build Markov prediction chains comprising transition probabilities between sequential elements of the simplified paths;
generate a character heatmap on a graphical user interface (GUI) for each simplified path processed by the plurality of anomalous log data prediction models based on the transition probability for each string of each path, wherein the transition probability indicates a probability of characters in each string of each path, and the character heatmap designates each character in each simplified path as high likelihood or low likelihood; and
display on the GUI one or more anomalies detected in the log, wherein the one or more anomalies are detected based on use the plurality of anomalous log data prediction models to detect anomalies and the character heatmap.

9. The non-transitory computer readable storage medium of claim 8, wherein
the A-replace operation comprises performing regular expression (regex) character replacement for one or more special characters in the plurality of strings by replacing (a) one or more alphanumeric characters, (b) one or more numbers, or (c) one or more upper case characters, one or more low case characters, and one or more numbers, and
performing the regex character replacement identifies one or more common patterns of special characters that comprise globally unique identifiers (GUIDs).

10. The non-transitory computer readable storage medium of claim 8, wherein the program instructions are executable to:
cause the GUI to identify an anomaly in the log by displaying a sequence of characters in a path in a bolded, underlined, or bigger font, wherein the sequence of characters is determined to be unusual based on the anomalous log data prediction models.

11. The non-transitory computer readable storage medium of claim 8, wherein the program instructions are executable to:
receive a new process event;
extract a new path from the new process event;
process the new path using the plurality of trained anomalous log data prediction models that are trained using the updated dataset that comprises a plurality of transition probabilities of a plurality of paths;
generate an updated character heatmap that indicates a likelihood of each character in the new path predicted by each of the plurality of trained anomalous log data prediction models; and
generate a regex replacement or normalization for (a) each of one or more new strings in the new path and (b) for one or more existing strings in the path or in other paths in the log that creates a new simplified path for one or more of the plurality of trained anomalous log data prediction models.

12. The non-transitory computer readable storage medium of claim 11, wherein the program instructions are executable to:
access the updated character heatmap;
compare each of the new simplified paths for each of the plurality of trained anomalous log data prediction models based on the likelihood that each character in the new path is high likelihood or low likelihood; and
based on the comparing, identify one or more new simplified paths of one or more trained anomalous log data prediction models as anomalous.

13. The non-transitory computer readable storage medium of claim 8, wherein the program instructions are executable to:
receive historical log data;
batch the historical log data into a plurality of paths; and
filter the plurality of paths based on a single type of string of one or more types of strings that are part of the plurality of paths.

14. The non-transitory computer readable storage medium of claim 13, wherein
the one or more types of strings comprise a file path and a child process, and
the plurality of strings comprise a plurality of key/value (KV) pairs.

15. A system comprising:
one or more processors; and
a memory coupled to the one or more processors, wherein the memory stores program instructions executable by the one or more processors to:
access a log comprising a path with a plurality of strings;
pre-process the log to generate an updated dataset, wherein the updated dataset includes a simplified path generated based on the path, wherein the simplified path is generated by performing an A-replace operation on the path, wherein the A-replace operation replaces each sequence of characters in a particular character set with a single-character sequence of a same length as the replaced sequence;

train a plurality of anomalous log data prediction models using the updated dataset by processing simplified paths in the updated dataset at a character level and at a name level to build Markov prediction chains comprising transition probabilities between sequential elements of the simplified paths;

generate a character heatmap on a graphical user interface (GUI) for each simplified path processed by the plurality of anomalous log data prediction models based on the transition probability for each string of each path, wherein the transition probability indicates a probability of characters in each string of each path, and the character heatmap designates each character in each simplified path as high likelihood or low likelihood; and display on the GUI one or more anomalies detected in the log, wherein the one or more anomalies are detected based on the plurality of anomalous log data prediction models and the character heatmap.

16. The system of claim 15, wherein the A-replace operation comprises performing regular expression (regex) character replacement for one or more special characters in the plurality of strings by replacing (a) one or more alphanumeric characters, (b) one or more numbers, or (c) one or more upper case characters, one or more low case characters, and one or more numbers, and performing the regex character replacement identifies one or more common patterns of special characters that comprise globally unique identifiers (GUIDs).

17. The system of claim 15, wherein the program instructions are executable to:

cause the GUI to identify an anomaly in the log by displaying a sequence of characters in a path in a bolded, underlined, or bigger font, wherein the sequence of characters is determined to be unusual based on the anomalous log data prediction models.

18. The system of claim 15, wherein the program instructions are executable to:

receive a new process event;

extract a new path from the new process event;

process the new path using the plurality of trained anomalous log data prediction models that are trained using the updated dataset that comprises a plurality of transition probabilities of a plurality of paths;

generate an updated character heatmap that indicates a likelihood of each character in the new path predicted by each of the plurality of trained anomalous log data prediction models; and generate a regex replacement or normalization for (a) each of one or more new strings in the new path and (b) for one or more existing strings in the path or in other paths in the log that creates a new simplified path for one or more of the plurality of trained anomalous log data prediction models.

19. The system of claim 18, wherein the program instructions are executable to:

access the updated character heatmap;

compare each of the new simplified paths for each of the plurality of trained anomalous log data prediction models based on the likelihood that each character in the new path is high likelihood or low likelihood; and based on the comparing, identify one or more new simplified paths of one or more trained anomalous log data prediction models as anomalous.

20. The system of claim 15, wherein the program instructions are executable to:

receive historical log data;

batch the historical log data into a plurality of paths; and filter the plurality of paths based on a single type of string of one or more types of strings that are part of the plurality of paths.

* * * * *